(12) United States Patent
Kobayashi et al.

(10) Patent No.: US 8,041,337 B2
(45) Date of Patent: *Oct. 18, 2011

(54) CONTROL DEVICE, COMMUNICATION TERMINAL DEVICE, SERVER DEVICE, SERVICE PROVIDING SYSTEM, PARAMETER MODIFICATION METHOD, SERVICE PROVIDING METHOD, AND CONTROL METHOD OF SERVER DEVICE

(75) Inventors: Hideyuki Kobayashi, Kyoto (JP); Shinichi Mukaigawa, Kyoto (JP); Tanichi Ando, Kyoto (JP)

(73) Assignee: Omron Automotive Electronics Co., Ltd., Achi (JP)

( * ) Notice: Subject to any disclaimer, the term of this patent is extended or adjusted under 35 U.S.C. 154(b) by 0 days.

This patent is subject to a terminal disclaimer.

(21) Appl. No.: 12/213,738

(22) Filed: Jun. 24, 2008

(65) Prior Publication Data

US 2008/0268810 A1    Oct. 30, 2008

Related U.S. Application Data

(63) Continuation of application No. 10/534,760, filed as application No. PCT/JP03/14409 on Nov. 12, 2003, now Pat. No. 7,433,676.

(30) Foreign Application Priority Data

Nov. 15, 2002 (JP) ................... 2002-332843

(51) Int. Cl.
*H04M 11/00* (2006.01)

(52) U.S. Cl. ...................................... 455/405

(58) Field of Classification Search ............. 455/456.3, 455/701, 458.1, 414.1, 556.1, 412, 413, 418, 455/486, 558, 408, 60.1, 466, 405; 340/825.72

See application file for complete search history.

(56) References Cited

U.S. PATENT DOCUMENTS 6,169,897 B1    1/2001    Kariya
(Continued)

FOREIGN PATENT DOCUMENTS

JP         05-65707         8/1993
(Continued)

OTHER PUBLICATIONS

Japanese Interrogation and partial English Translation for Japanese Application No. 2004-553162; 4 pgs.

*Primary Examiner* — Melody Mehrpour
(74) *Attorney, Agent, or Firm* — Foley & Lardner LLP

(57) ABSTRACT

When a service providing server receives, from a mobile phone or the like owned by a user, a request to modify a parameter defining the performance of a control device provided in an automobile, the service providing server transmits a requested modification command to the control device. The control device modifies the parameter thereof in accordance with the modification command received from the service providing server. Further, the service providing server records a history of the modification command having been transmitted on a user-by-user basis, and settles an account of the user every predetermined period of time, by requesting the user to pay a fee for the modification. Thus, a service provider is able to charge the user for modifying various parameters defining performance of the control device.

21 Claims, 14 Drawing Sheets

U.S. PATENT DOCUMENTS

| | | |
|---|---|---|
| 6,246,672 B1 | 6/2001 | Lumelsky |
| 6,711,474 B1 | 3/2004 | Treyz et al. |
| 6,751,454 B2 | 6/2004 | Thornton |
| 6,871,048 B2 | 3/2005 | Takagaki |
| 7,433,676 B2 * | 10/2008 | Kobayashi et al. ............ 455/408 |
| 7,532,880 B2 * | 5/2009 | Mazzara, Jr. .................. 455/418 |
| 7,536,189 B2 * | 5/2009 | Himmelstein ............. 455/456.1 |
| 7,546,251 B1 * | 6/2009 | Leatherman et al. ........... 705/26 |
| 2005/0046584 A1 | 3/2005 | Breed |

FOREIGN PATENT DOCUMENTS

| | | |
|---|---|---|
| JP | 08-263113 A | 10/1996 |
| JP | 11-189113 | 7/1999 |
| JP | 2000-004485 | 1/2000 |
| JP | 2001-065212 | 3/2001 |
| JP | 2001-319287 | 11/2001 |
| JP | 2002-052992 | 2/2002 |
| JP | 2002-308055 A | 10/2002 |

* cited by examiner

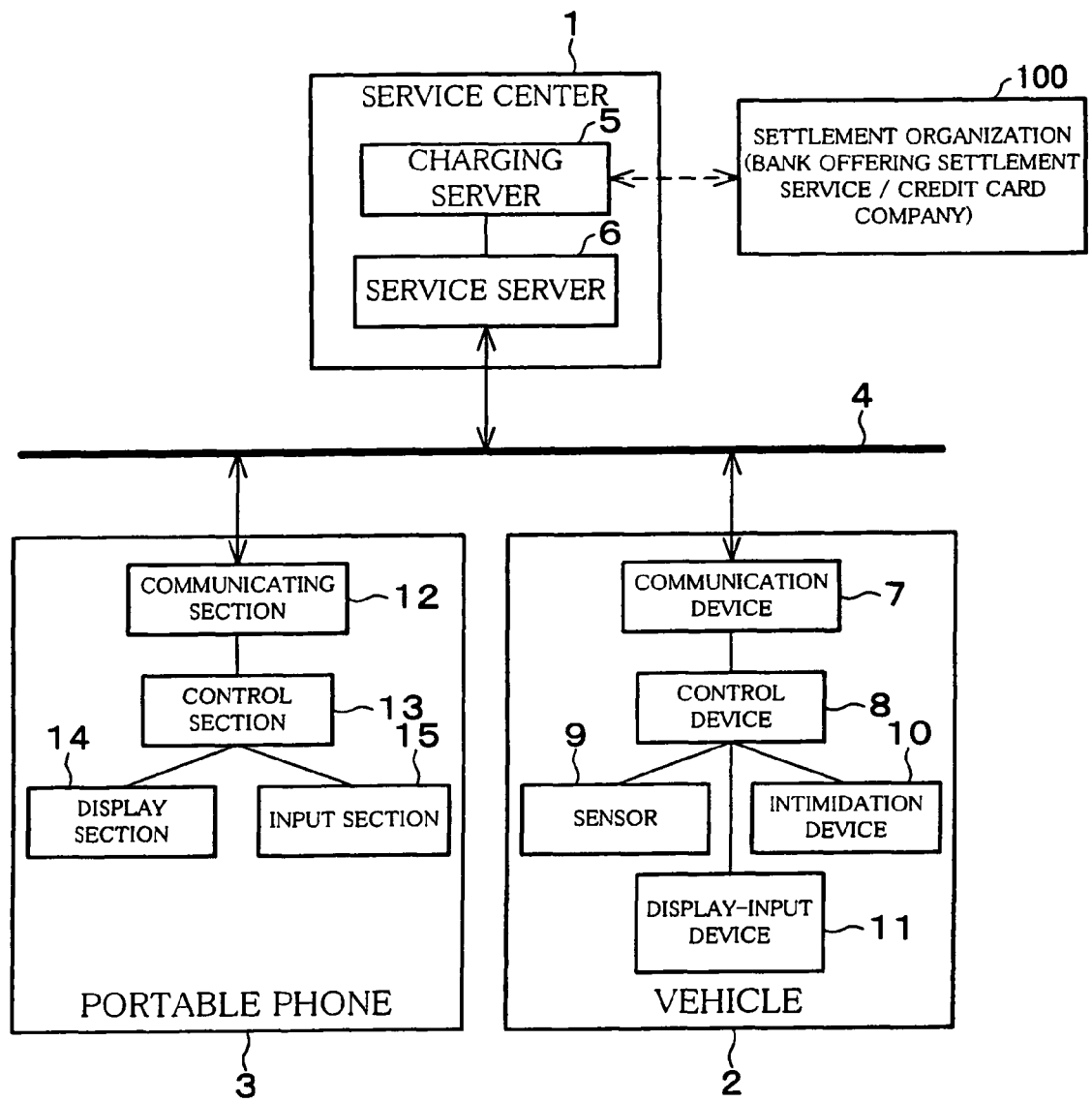

FIG. 3

|  | INTIMIDATION ACTION | | | | | | REPORTING ACTION | | | |
| --- | --- | --- | --- | --- | --- | --- | --- | --- | --- | --- |
|  | 1 BEEPING OF HORN | 2 FLASHING OF HAZARD LIGHT | 3 FLASHING OF HEADLIGHT | 4 SOUND OUTPUT FROM IN-VEHICLE SPEAKER | 5 LOCKING OF BRAKE | 6 STOP OF ENGINE | 1 REPORTING BY E-MAIL | 2 REPORTING BY PHONE-CALL | 3 CALLING OUT OF A SECURITY GUARD | 4 REPORTING TO THE SERVICE CENTER |
| 1. DETECTION OF ABNORMAL SITUATION IN IMAGE CAPTURED BY CCD CAMERA |  |  |  | O |  |  | O |  |  | O |
| 2. DETECTION OF ABNORMAL SOUND BY MICROPHONE |  |  |  | O |  |  | O |  |  | O |
| 3. DETECTION OF VARIATION IN PRESSURE BY WIND PRESSURE SENSOR |  | O | O | O |  |  | O |  |  |  |
| 4. DETECTION OF ABNORMAL SITUATION IN BATTERY VOLTAGE |  | O | O |  |  |  | O |  |  |  |
| 5. DETECTION OF ABNORMAL SITUATION IN SPEED-PULSE | O |  |  |  | O | O | O | O | O |  |
| 6. DETECTION OF ABNORMAL SITUATION BY ACCELERATION SENSOR | O |  |  |  | O | O | O | O |  |  |
| 7. DETECTION OF DOOR OPENING/CLOSING | O |  |  |  |  |  | O |  |  |  |

FIG. 4

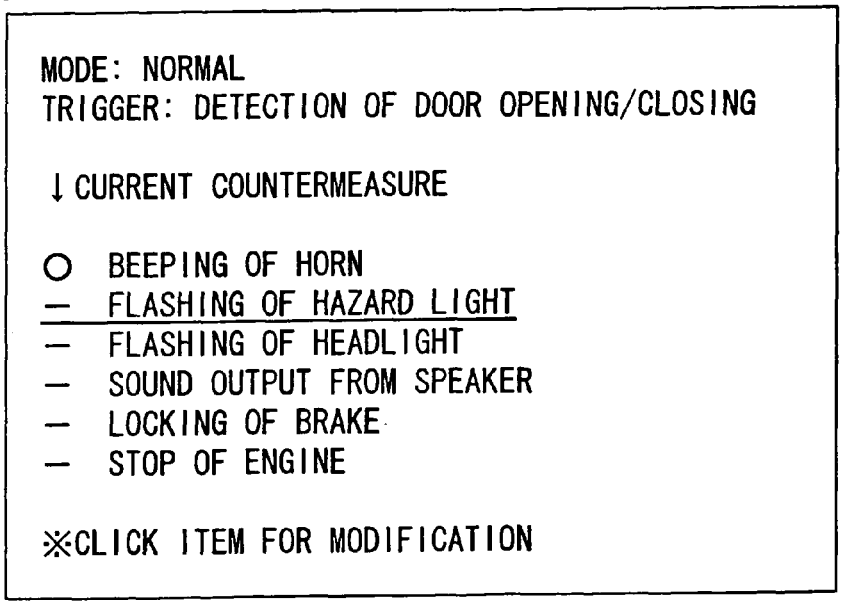

```
MODE: NORMAL
TRIGGER: DETECTION OF DOOR OPENING/CLOSING

↓ CURRENT COUNTERMEASURE

O   BEEPING OF HORN
—   FLASHING OF HAZARD LIGHT
—   FLASHING OF HEADLIGHT
—   SOUND OUTPUT FROM SPEAKER
—   LOCKING OF BRAKE
—   STOP OF ENGINE

※CLICK ITEM FOR MODIFICATION
```

FIG. 8

| | 1. MONITORING OF IMAGE BY CCD CAMERA | 2. DETECTION OF ABNORMAL SOUND BY MICROPHONE | 3. DETECTION OF VARIATION IN PRESSURE BY WIND PRESSURE SENSOR | 4. DETECTION OF VOLTAGE VARIATION IN BATTERY VOLTAGE | 5. DETECTION IN SPEED-PULSE | 6. DETECTION BY ACCELERATION SENSOR | 7. DETECTION OF DOOR OPENING/CLOSING SIGNAL |
|---|---|---|---|---|---|---|---|
| 1. MONITORING OF IMAGE BY CCD CAMERA | − | ○ | ○ | ○ | ○ | ○ | ○ |
| 2. DETECTION OF ABNORMAL SOUND BY MICROPHONE | − | − | × | ○ | ○ | ○ | ○ |
| 3. DETECTION OF VARIATION IN PRESSURE BY WIND PRESSURE SENSOR | − | − | − | ○ | ○ | ○ | × |
| 4. DETECTION OF VOLTAGE VARIATION IN BATTERY VOLTAGE | − | − | − | − | ○ | ○ | ○ |
| 5. DETECTION IN SPEED-PULSE | − | − | − | − | − | △ | ○ |
| 6. DETECTION BY ACCELERATION SENSOR | − | − | − | − | − | − | ○ |
| 7. DETECTION OF DOOR OPENING/CLOSING SIGNAL | − | − | − | − | − | − | − |

○: POSSIBLE
△: POSSIBLE BUT NOT RECOMMENDED
×: IMPOSSIBLE

FIG. 9

| DAY | TIME | WORK | CONTENTS | REMARKS |
|---|---|---|---|---|
| 2002/04/02 | 15:43:02 | ADDITION | STARTING OF SERVICE | |
| 2002/04/18 | 13:05:55 | ADDITION | INTIMIDATING HORN | |
| 2002/05/10 | 10:10:02 | ADDITION | OPTIONAL LED-1 | TRIAL START |
| 2002/06/10 | 10:10:02 | CANCEL | OPTIONAL LED-1 | TRIAL END |
| 2002/06/12 | 09:50:24 | ADDITION | OPTIONAL LED-1 | |
| | | | | |
| | | | | |
| | | | | |

FIG. 10

| DAY | TIME | SERVICE | 1 MONITORING OF IMAGE BY CCD CAMERA | 2 DETECTION OF ABNORMAL SOUND BY MICROPHONE | 3 DETECTION OF VARIATION IN PRESSURE BY WIND | 4 DETECTION OF VOLTAGE VARIATION IN BATTERY | 5 DETECTION IN SPEED-PULSE | 6 DETECTION BY ACCELERATION SENSOR | 7 DETECTION OF DOOR OPENING/CLOSING SIGNAL | 1 ALERT LED (SIMPLE) | 2 ALERT LED (SWING) | 3 INTIMIDATION HORN | 4 ADDITIONAL REMOTE CONTROLLER | FADING-OUT LED | MELODY ALARM |
|---|---|---|---|---|---|---|---|---|---|---|---|---|---|---|---|
| 2002/4/2 | 15:43:02 | ○ | — | — | — | — | ○ | — | ○ | — | — | — | — | — | — |
| 2002/4/18 | 13:05:55 | ○ | — | — | — | — | ○ | — | ○ | — | — | ○ | — | — | — |
| 2002/5/10 | 10:10:02 | ○ | — | — | — | — | ○ | — | ○ | — | — | ○ | — | ○ | — |
| 2002/6/10 | 10:10:02 | ○ | — | — | — | — | ○ | — | ○ | — | — | ○ | — | × | — |
| 2002/6/12 | 9:50:24 | ○ | — | — | — | — | ○ | — | ○ | — | — | ○ | — | ○ | — |
| | | | | | | | | | | | | | | | |
| | | | | | | | | | | | | | | | |

FIG. 11

```
OPTION/PART ADDITION
⇒DIRECT INPUT OF PRODUCT ID

⇒SELECTION FROM LIST
1. ALERT LED (SIMPLE)
2. ALERT LED (SWING)
3. INTIMIDATION HORN
4. ADDITIONAL REMOTE CONTROLLER
5. OTHER
```

CONTROL DEVICE, COMMUNICATION TERMINAL DEVICE, SERVER DEVICE, SERVICE PROVIDING SYSTEM, PARAMETER MODIFICATION METHOD, SERVICE PROVIDING METHOD, AND CONTROL METHOD OF SERVER DEVICE

CROSS REFERENCE TO RELATED APPLICATIONS

This application is a continuation of U.S. application Ser. No. 10/534,760, filed Jul. 5, 2005, which is a U.S. National Stage application of PCT/JP03/14409, filed Nov. 12, 2003, which claims priority to Japanese application number 2002-332843, filed Nov. 15, 2002, the entire contents of which are incorporated herein be reference in their entirety.

TECHNICAL FIELD

The present invention relates to a charging method for use in a service providing system for providing, via a communication network, an information providing service, a service providing server, a service providing program, a storage medium storing the service providing program, a terminal device, a terminal processing program, and a storage medium storing the terminal processing program.

BACKGROUND ART

Outstanding progress in communication technology and development of a communication infrastructure in recent years have enabled people to exchange various kinds of data via various communication lines. For example, the Internet which is rapidly growing its popularity throughout the world has allowed exchanging of various kinds of data (information), or downloading of application programs to be used. Furthermore, the Internet allows not only a PC (personal computer)-to-PC data exchange, but also a data exchange between a PC and a device such as a portable phone and a portable information terminal. For this reason, Internet-based information communications, along with these information devices, are expected to become even more prevalent.

In response to the development of the information society, an information environment for automobiles or the like has been also showing a rapid advancement. For example, automobiles have conventionally been provided with a device such as an FM/AM radio and/or an MD/CD player. In addition, there is a growing trend of further providing these automobiles with various in-vehicle information devices, such as a vehicle-antitheft device, a navigation system, and/or a CD-ROM/DVD-ROM drive.

For example, in an in-vehicle information device amongst such information devices, data downloading has been performed for updating of the data stored in the in-vehicle information device. In a meanwhile, programs or the like have been downloaded in a typical PC (Personal Computer). Amongst these programs, there has been software so-called shareware which requires a user to make a payment, in order to fully use the program after a trial period thereof. As described, there has conventionally been a widely-spreading form of practices in which users are charged for obtaining some kind of data through communications.

Note that the followings are Patent documents 1 and 2 of the prior art.

Patent document 1 (Japanese Unexamined Patent Publication No. 11-189113/1999 (Tokukaihei 11-189113; published on Jul. 13, 1999) discloses a method for updating in-vehicle information device. The method is aimed at updating an in-vehicle information device through a simple procedure, without a need of complicated working procedure. More specifically, a head unit and an in-vehicle information device are connected to each other via a data transmission path, thereby constituting an in-vehicle information network system. The head unit is provided with an input slot for accepting a storage medium storing an updating program. When this input slot is loaded with the storage medium, the head unit transmits, to a predetermined in-vehicle information device to be updated, a communication frame including: (I) command data containing an updating command; and (II) source data containing the updating program from the recording medium. In a meanwhile, the in-vehicle information device receives the communication frame, and executes the updating program based on the command data and the source data in the communication frame.

Patent document 2 (Japanese Unexamined Patent Publication No. 2000-4485 (Tokukai 2000-4485; published on Jan. 7, 2000)) discloses a singlecast interactive radio system. This system is aimed at economically transmitting, to a subscriber, a digitalized audio based content with quality of a spoken voice, upon request from the subscriber. More specifically, the system includes a personal radio station server and a plurality of user terminals, and utilizes one of existing wireless communication networks as a transmission medium. Information of a highly compressed voice content is stored in a data network server. The personal radio station server stores therein subscribers' profiles with topics of individual interest, and assembles a content material from various websites, in accordance with the topics. Then, from this personal radio station server, the content is transmitted upon request from a subscriber, to a subscriber's user terminal via the wireless digital data network. The user terminal restores voice-based material with AM-radio voice quality or better.

However, in a terminal device owned by a user, there is no charging system for charging a user for modification of various parameters each determining an operation of the terminal, such as what action is taken in what circumstance in an vehicle-antitheft device, for example.

Here, in a portable phone system or the like, for example, there has been a system that allows a user to modify a content of a contract (e.g. discount plans) by inputting a request via a portable phone. This system allowing a user to modify a service content provided by a portable phone company, however, does not allow aforementioned modification in an operation of a terminal device owned by a user.

Further, there has been a system in which a data set is given a valuation in the form of point, credit, money, or the like, and the valuation is used for exchange. However, there has not been a system allowing free exchanging of information (i.e., giving a piece of information in trade for another piece of information), the system deeming data-to-data exchange as a unit of exchanging. In short, there is no information bartering system.

DISCLOSURE OF INVENTION

An object of the present invention is to provide: a charging method for use in a service providing system; a service providing server; a service providing program; a storage medium storing the service providing program; a terminal device; a terminal processing program; and a storage medium storing the terminal processing program; each of which allowing a provider of an information providing service to charge a user for modifying various parameters determining an operation of a terminal device owned by the user, thus realizing a new business model.

In order to achieve the foregoing object, a charging method of the present invention may be a charging method for use in a service providing system having (a) a first terminal device owned by a user and (b) a service providing server, connected to the first terminal device via a communication network, offering an information providing service to the first terminal device, the method comprising: (I) a step of a service providing server transmitting, to the first terminal device, a modification command for modifying a predetermined parameter determining an operation of the first terminal device; (II) a step of the first terminal device modifying the predetermined parameter only when the first terminal device receives the modification command for modifying the predetermined parameter from the service providing server; and (III) a step of the service providing server charging the user owning the first terminal device a fee for the transmission of the modification command for modifying the predetermined parameter, in a case where the service providing server transmits, to the first terminal device, the modification command for modifying the predetermined parameter.

With the foregoing method, the modification of the predetermined parameters determining the operation of the control device owned by the user is not carried out unless the service providing server gives the modification command. That is to say that, without permission from the service providing server, the user is not able to modify the predetermined parameters determining the operation of the user's control device. When the service providing server gives the control device a command for modifying the predetermined parameters, the user who requested the modification is charged a fee.

Thus, there is realized a business model in which a user is charged for modification of a predetermined parameter determining an operation of a control device owned by the user. More specifically, a service provider administrating the service providing server is able to ensure income from the foregoing business model. By using this income, the service provider can provide various information services or the like at a low price, or even provide them free of charge. As a result, it is possible to realize an information service system that can also benefit users as well.

It should be noted that, in the present invention, the term "parameter" means information that determines the operation of the control device. Examples of the "parameter" are: designation of On/Off state of a sensor; upper/lower limit values of a detection range of the sensor; and a control program controlling the entire control device.

Further, in the present invention, the service provider may be rewarded with money from the user, for providing a service, however, the reward for providing the service is not limited to money. For example, the service provider may be rewarded in the form of ticket or point issued by the service provider or other organizations. For example, in a case where the user is charged a valuation for a service provided, and the charge is settled by points, the number of points corresponding to the valuation is subtracted from the number of points the user has.

Additional objects, features, and strengths of the present invention will be made clear by the description below. Further, the advantages of the present invention will be evident from the following explanation in reference to the drawings.

BRIEF DESCRIPTION OF DRAWINGS

FIG. 2 is a block diagram showing an arrangement of the service providing system according to one embodiment of the present invention.

FIG. 3 is an explanatory diagram showing an example of a typical abnormal situation detection vs. countermeasure table in the service providing system shown in FIG. 2.

FIG. 4 is an explanatory diagram showing an arrangement of a service content modification process screen displayed on a display section of the service providing system shown in FIG. 2.

FIG. 8 is an explanatory diagram showing an example of a combination table stored in a product information database in the service server shown in FIG. 7.

FIG. 9 is an explanatory diagram showing an example of history information stored in a history information database in the service server shown in FIG. 7.

FIG. 10 is an explanatory diagram showing another example of the history information stored in the history information database in the service server shown in FIG. 7.

FIG. 11 is an explanatory diagram showing an example of option selecting screen displayed on a portable phone connected to the service server shown in FIG. 7.

BEST MODE FOR CARRYING OUT THE INVENTION

Embodiment 1

Figure 1:
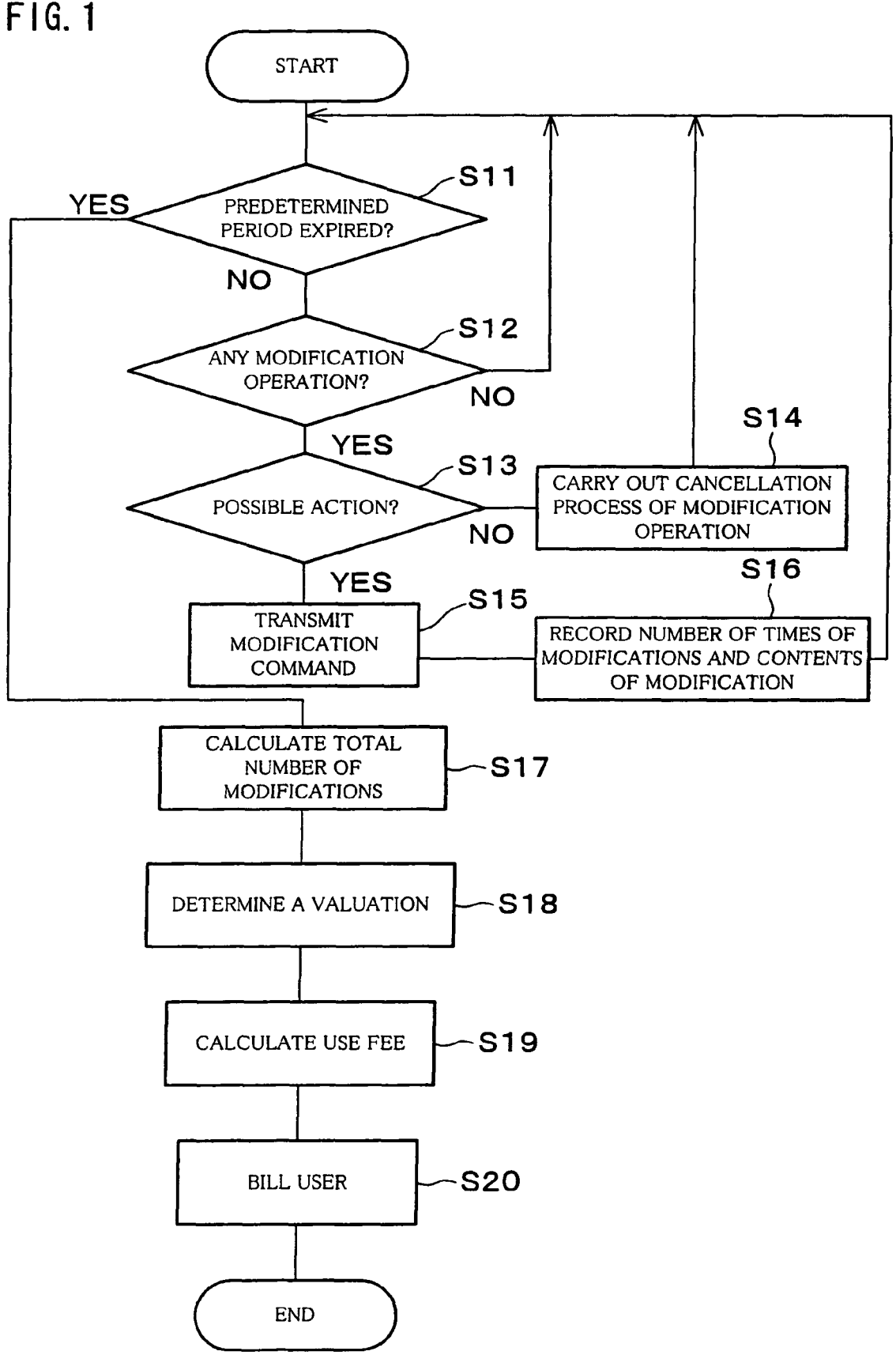
FIG. 1 is a flowchart showing an example of a charging process carried out in a service providing system according to one embodiment of the present invention.

An embodiment of the present invention is described below, with reference to FIGS. 1 through 5.

The present embodiment deals with a service providing system which provides a vehicle-antitheft service, and/or other data communication services by using an in-vehicle terminal device provided in a vehicle such as an automobile.

(Schematic Configuration of Service Providing System)

As shown in FIG. 2, the service providing system of the present embodiment is provided with: a service center 1; a vehicle 2 including an in-vehicle terminal device or the like; and a portable phone (second terminal device) 3 owned by a user. Note that FIG. 2 shows only one portable phone and one vehicle 2. However, there are actually plural automobiles 2 and plural portable phones 3, corresponding to the number of plural users. These are connected to one another via a communication network 4 including the Internet, a public circuit or the like.

The service center 1 centralizes control of the service providing system to offer a service. This service center 1 is provided with a charging server 5 and a service server 6, both of which make up a service providing server.

The service server 6 is a server computer which carries out a process of providing a vehicle-antitheft service and other data communication services to the vehicle 2 and the portable phone 3. The accounting server 5 is a server computer which carries out a process of managing a charge for a service having been provided from the service server 6 to the user. Note that the present embodiment deals with a case where the service server 6 and the accounting server 5 are separate server computers. However, a single server computer may have a service providing function and a charging management function. Further, the accounting server 5 may (i) entrust an account settlement to a computer of a settlement organization 100, through which the user makes a payment, and (ii) settle the user's account by reporting an amount of charge the user owes (FIG. 2). The settlement organization 100 can be, for example, a bank providing a settlement service, a credit card company, or the like.

The vehicle 2 is an automobile owned by the user who receives the service. In addition to conventional automobile functions such as a travelling function and other functions, the vehicle 2 is further provided with: a communication device 7; a control device (first terminal device) 8; a sensor 9; an intimidation device 10; and a display/input device 11.

The communication device 7 carries out a communication process of communicating, via the communication network 4, with the service server 66 or the portable phone 3. A communication scheme used in the communication device 7 can be a scheme in which communications are carried out, via a public telephone line, by using a wireless communication function of a portable phone, PHS (registered trademark), or the like. Further, the communication scheme can be also a scheme in which communications are carried out by using a DSRC (Dedicated Short Range Communication) system. However, the communication scheme is not limited as long as it allows wireless communications.

The control device 8 controls various operations in the vehicle 2, and carries out various processes for receiving the service. For example, the control device 8 is provided with: a computing device such as a CPU; an RAM (Random Access Memory) serving as a work memory; a nonvolatile storage medium for storing therein various kinds of data; and a terminal device having a removal media drive for reading and/or writing data into various removal media. The various processes which the control device 8 carries out are executed by running respective programs therefor.

The display/input device 11 is provided with: displaying means for indicating a various contents of controls and/or operations or the like carried out in the control device 8; and input means for accepting a command entered by the user aboard the vehicle 2. For example, the display/input device 11 is a device in which a touch panel serving as the input means is provided on a surface of a display panel such as a liquid crystal display. It is needless to mention that the display/input device 11 may be also provided with various buttons or the like serving also as the input means.

As described, the in-vehicle terminal device in the vehicle 2 is realized by the communication device 7, the control device 8, and the display/input device 11. This in-vehicle terminal device may further provided with a GPS (Global Positioning System) function, a navigation function, and/or an AV (audio-visual) function. The sensor 9 can be various sensors provided in the vehicle 2. Examples of the sensor 9 are a CCD (Charge Coupled Device) camera, a microphone, a wind pressure sensor, a battery-voltage sensor, a speed sensor, an acceleration sensor, and a door-opening/closing sensor. These sensors are described in detail later.

The intimidation device 10 is for carrying out various operations for intimidating a suspicious individual. This intimidation device 10 basically utilizes a feature normally provided in the vehicle 2. For example, a horn, a hazard light, a headlight, an in-vehicle speaker, a braking system, or an engine control system is used. Further, the intimidation device 10 may be a device, for use in intimidation, which is not normally provided in an automobile.

On the other hand, the portable phone 3 is a portable phone owned by the user who receives the service. As shown in FIG. 2, this portable phone 3 is provided with a communication section 12, a control section 13, a display section 14, and an input section 15.

The communication section 12 carries out a communication process for data communicating with the service server 66 or the vehicle 2, via the communication network 4. In a communication scheme used in the communication section 12, communications are carried out, via a public telephone line, by using a wireless communication function of a portable phone, PHS or the like.

The control section 13 controls various operations in the portable phone 3, and carries out various processes for receiving the service. This control section 13 is, for example, provided with: a computing device such as a CPU; a RAM (Random Access Memory) serving as a work memory; a nonvolatile recording medium for storing therein various kinds of data.

The display section 14 displays various operational statuses in the portable phone 3. This display section 14 is, for example, realized by a display panel such as a liquid crystal display or an organic EL (electroluminescence) display. The input section 15 accepts a command entered by the user of the portable phone 3, and is realized by various buttons. For example, in a case where the control section 13 is provided with a browser serving as an application for browsing various websites during connection to the Internet, a browser screen is displayed on the display section 14, and various inputs with respect to the browser are carried out via the input section 15.

It should be noted that the present embodiment deals with a case where the terminal device carried by the user is the portable phone 3. However, the present invention is not limited to this, and the terminal device may be a portable terminal device such as a PDA (Personal Digital Assistant). In this case, for example, communications may be carried out in an area where a wireless LAN connection service is provided.

(Sensors)

Next, the following describes various kinds of the sensor 9 and what is detected by using the each kind of the sensor 9. As mentioned above, the sensor 9 can be: a CCD camera; a microphone; a wind pressure sensor; a battery-voltage sensor; a speed sensor; an acceleration sensor; and a door-opening/closing sensor.

The CCD camera is provided in a predetermined position of the vehicle 2. This CCD camera is used for capturing an image of, for example, a car interior of the vehicle 2 and/or an image of the outside environment surrounding the vehicle 2. Image data captured by using the CCD camera is transmitted to the control device 8. Then, an image analysis is carried out in the control device 8 with respect to the image data for detection of an abnormal situation. In the image analysis, detection of an abnormal situation is carried out in such a manner that as a result of comparison between a currently captured image and an image captured in a normal state, a portion of the currently captured image, which is different from the image captured in the normal state, is extracted, and then it is judged whether or not the extracted portion of the currently captured image is an image of a human being such as a suspicious person, for example.

The microphone is a sensor, provided in a predetermined position of the vehicle 2, for sensing sound. An audio signal obtained by using the microphone is transmitted to the control device 8. Then, a sound analysis is carried out in the control device 8 with respect to the audio signal for detection of an abnormal situation. In this sound analysis, for example, upon detection of sound of a predetermined sound volume or more, judgment of the detected sound as being abnormality and the like operation is carried out.

The wind pressure sensor is a sensor, provided in a predetermined position of the vehicle 2, for detecting a pressure. A pressure detection signal obtained by using the wind pressure sensor is transmitted to the control device 8. Then, a pressure variation analysis is carried out in the control device 8 with respect to the pressure detection signal for detection of an abnormal situation. By setting this wind pressure sensor in such a position of the vehicle 2 where the wind pressure sensor is exposed to the outside air, it is possible to: (i) detect whether or not the automobile is moving; and (ii) detect a wind pressure around the automobile; in accordance with a detection result obtained from the wind pressure sensor.

The battery-voltage sensor is a sensor, provided in the vehicle 2, for detecting an output voltage from a battery. A voltage detection signal obtained by using the battery-voltage sensor is transmitted to the control device 8. Then, a voltage variation analysis is carried out in the control device 8 with respect to the voltage detection signal for detection of an abnormal situation. By detecting a battery-voltage, it is possible to grasp a state of power consumption in the vehicle 2.

The speed sensor is a sensor for detecting a speed of the vehicle 2. A speed signal obtained by using the speed sensor is transmitted to the control device 8. Then, a speed analysis is carried out in the control device 8 with respect to the speed signal, for detection of an abnormal situation. By detecting the speed, it is possible to grasp a traveling speed of the vehicle 2.

The acceleration sensor is a sensor for detecting an acceleration of the vehicle 2. An acceleration signal obtained by using the acceleration sensor is transmitted to the control device 8. Then, an acceleration analysis is carried out in the control device 8 with respect to the acceleration signal, for detection of an abnormal situation. With this acceleration sensor, it is possible to: (i) detect the acceleration/deceleration of the vehicle 2 while the vehicle 2 is moving; and (ii) detect tilting of the vehicle 2.

The door-opening/closing sensor is a sensor for detecting whether a door of the vehicle 2 is opened or closed. A door opening/closing signal obtained by using the door-opening/closing sensor is transmitted to the control device 8. Then, an analysis of door-opening/closing status is carried out in the control device 8 with respect to the door-opening/closing signal, for detection of an abnormal situation. By detecting whether the door is opened or closed, it is possible to (i) detect that the door is not completely closed, and (ii) detect opening and/or closing of the door by a suspicious individual.

(Vehicle-Antitheft Service)

Next described is the vehicle-antitheft service practiced by the service providing system. The vehicle-antitheft service of the present embodiment is as follows. When an abnormal situation is detected by the sensor 9 in the vehicle 2, the control device 8 of the vehicle 2 causes an intimidation device 10 to carry out an intimidation action, in accordance with what has been detected as the abnormal situation. Further, a reporting action is carried out as needed so as to report the occurrence of the abnormal situation to the service server 6 and the portable phone 3.

Examples of the intimidation action are: (1) beeping of the horn; (2) flashing of the hazard light; (3) flashing of the headlight; (4) sound output from an in-vehicle speaker; (5) locking of the brake; and (6) stopping of the engine. For example, in a case where a suspicious individual tries to thieve the vehicle, the (1) beeping of the horn causes a large volume of sound to travel around the vehicle, thus attracting an attention of a person nearby the vehicle. An attention of a person nearby the vehicle can be also attracted by carrying out the (2) flashing of the hazard light or the (3) flashing of the headlight. Further, the (4) sound output from an in-vehicle speaker gives a psychological pressure to the suspicious individual. Further, even if the suspicious person succeeds in moving the vehicle 2 through an illicit process, the vehicle 2 can be stopped moving by carrying out, for example, the (5) locking of the brake or (6) stopping of the engine.

Examples of the reporting action are: (1) reporting by e-mail; (2) reporting by phone-call; (3) calling out of a security guard; and (4) reporting to the service center. The (1) reporting by e-mail is such that the control device 8 of the vehicle 2 e-mails the user's portable phone 3 when an abnormal situation is detected, so as to report the user that the abnormal situation has been detected. The (2) reporting by phone-call is such that the control device 8 of the vehicle 2 makes a phone call to the user's portable phone 3 when an abnormal situation is detected, so as to report the user that the abnormal situation has been detected. In this case, an automated reporting system or the like is used for making the report. The report by phone call is carried out if an abnormal situation detected is more urgent than an abnormal situation reported by e-mail.

By carrying out the (3) calling out of a security guard, a detection of an abnormal situation is reported to the service center 1. Then a security company or the like is instructed to dispatch a security guard to the site. This action is carried out in a case of an abnormal situation whose emergency level is so high that a security guard needs to be immediately dispatched to the site. The (4) reporting to the service center is such that the control device 8 of the vehicle 2 makes a report when an abnormal situation is detected, so as to report the service server 6 that the abnormal situation has been detected.

The foregoing intimidation actions and reporting actions are selectively carried out in accordance with an abnormal situation detection result obtained from the sensor 9. For example, if an abnormal situation detection result obtained by the sensor 9 indicates that a crucial incident such as theft is less likely to be taking place, a low-level intimidation action is selected, and the reporting action for a case of low emergency level is selected. On the other hand, in a case where an abnormal situation detection result obtained from the sensor 9 indicates that a crucial incident such as theft is likely to be taking place, a high-level intimidation action is selected, and the reporting action for a case of high emergency level is selected.

For example, the vehicle 2 may have an illegal intruder in a case where (i) the CCD camera capturing an image of the car interior detects an unusual image, or (ii) the microphone collecting a sound wave detects unusual sound. In such a case, the control device 8 controls an in-vehicle speaker so that intimidating sound is outputted from the in-vehicle speaker. Further, at the same time of detecting the abnormal situation, the control device 8 (i) reports the occurrence of the abnormal situation to the service server 6 via the communication device 7, and (ii) e-mails the user's mobile phone 3 so as to report the occurrence of the abnormal situation to the user. Yet, a possibility of the detected abnormal situation being an actual theft is low at this point. Therefore, the intimidation action and the reporting action are set at a relatively low level.

On the other hand, for example, in a case of detecting a speed pulse which is not outputted unless the vehicle 2 runs, the control device 8 judges that the possibility of a vehicle theft is high. In such a case, there is carried out a high level of the intimidation action such as the beeping of the horn, the locking of the brake, and the stopping of the engine. Further, the control device 8 (I) reports the case to the user, via the communication device 7, by (a) sending e-mail and (b) making a phone-call, and (II) requests the service center 1 to dispatch a security guard.

As described, the control device 8 changes a content of the intimidation action and the reporting action in accordance with an abnormal situation detection result obtained from the sensor 9. In order to realize this, the control device 8 stores therein an abnormal situation detection vs. countermeasure table indicating (i) various kinds of abnormal situation detection results, and (ii) the intimidation actions and the reporting actions respectively corresponding to the abnormal situation detection results. More specifically, when an abnormal situation is detected by the sensor 9, the control device 8 finds out which intimidation action and which reporting action should be carried out, by referring to the abnormal situation detection vs. countermeasure table. Then, the intimidation action and the reporting action thus found out from the abnormal situation detection vs. countermeasure table are carried out.

FIG. 3 is an example of the abnormal situation detection vs. countermeasure table for use in a normal alert state. A row-item describes an abnormal situation detected by the sensor 9, and a column-item describes a countermeasure to be carried out when an abnormal situation is detected. In FIG. 3, the countermeasure marked with a symbol "○" is taken, whereas a countermeasure marked with no symbol is not taken.

A plurality of the abnormal situation detection vs. countermeasure tables are provided for various conditions (modes), and the abnormal situation detection vs. countermeasure tables are changed over in accordance with the mode in effect. That is, by using various abnormal situation detection vs. countermeasure tables respectively corresponding to various occasions, it is possible to carry out a suitable vehicle-antitheft operations. Here, examples of the foregoing conditions (modes) are as follows: (i) parking an automobile in a normally used parking (normal mode); (ii) parking an automobile, during an outing, in a parking with a relatively high level of security (outing mode); (iii) parking an automobile, during an outing, in a parking with a relatively high level of risk (outing alert mode), and (iv) during a high level alert being in effect upon detection of an abnormal situation (danger mode).

(Process Flow of Vehicle-Antitheft Service)

Figure 5:
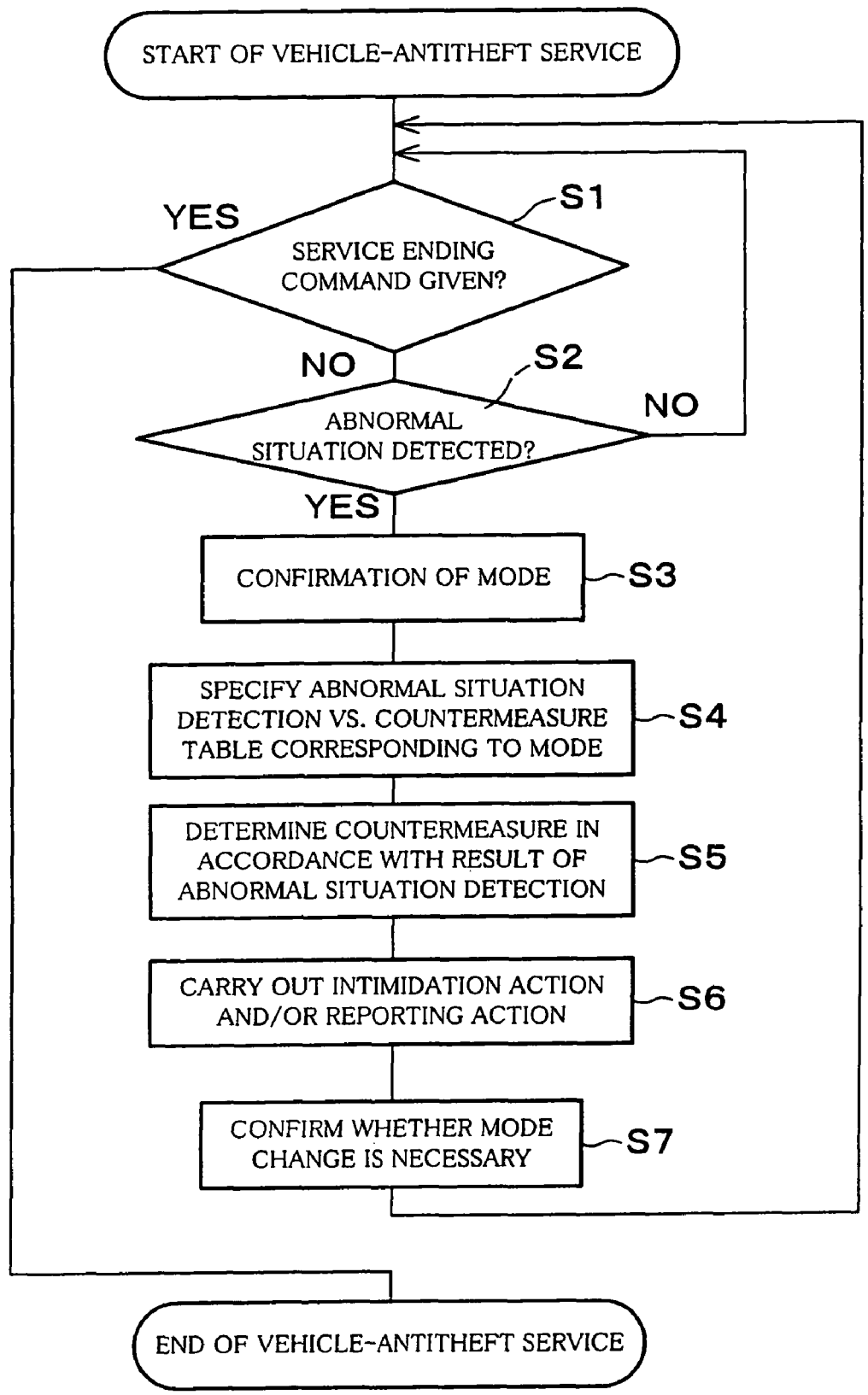
FIG. 5 is a flowchart showing a process of a vehicle-antitheft service in a service providing system shown in FIG. 2.

Next, a process flow of a vehicle-antitheft service is described with reference to a flowchart shown in FIG. 5. It should be noted that a process shown in the flowchart is essentially carried out by the control device 8 of the vehicle 2.

When the vehicle-antitheft service is started, it is confirmed, in the S1 (step 1), whether or not the user has given an instruction to end the vehicle-antitheft service. If the S1 resulted in "NO"; i.e., the instruction to end the service is not given, then it is confirmed in S2 whether or not the sensor 9 has detected an abnormal situation. If the S2 results in "NO"; i.e., no abnormal situation has been detected, then the process goes back to the S1. In short, the S1 is a state of waiting for the instruction to end the vehicle-antitheft service, and the S2 is a state of standing by for an abnormal situation to be detected. Note that if the S1 results in "YES"; i.e., the instruction to end the service is given, then the vehicle-antitheft service is ended.

In a meanwhile, if the S2 results in "YES"; i.e., the sensor 9 has detected an abnormal situation, then a confirmation of a mode is carried out in the S3. Here, the mode corresponds to aforementioned normal mode, outing mode, outing alert mode, danger mode, or the like. This mode is set by the user, at the time of starting the vehicle-antitheft service.

Next, in the S4, the abnormal situation detection vs. countermeasure table corresponding to the mode being in effect is specified. Then, in the S5, an intimidation action and a reporting action are determined based on the abnormal situation detected in the S2. In the S6, the intimidation action is carried out by the intimidation device 10, and the reporting action is carried out with respect to the service center 1 and the portable phone 3.

When the intimidation action and the reporting action are finished, it is confirmed, in the S7, whether or not a changeover of the mode is necessary. If the changeover of the mode is necessary, then the mode is changed over. The changing over of the mode is, for example, from the normal mode to the danger mode, and so on. Then, the process is repeated from the S1.

(Parameter Modification in Abnormal Situation Detection vs. Countermeasure Table)

Next described is a modification of a parameter of the abnormal situation detection vs. countermeasure table.

As mentioned above, under control of the control device 8 of the vehicle 2, the an intimidation action and a reporting action are carried out with reference to the abnormal situation detection vs. countermeasure table. However, it is convenient for the user, if the user can change a countermeasure to be carried out for each of abnormal situations. For example, in a case where the abnormal situation detection vs. countermeasure table shown in FIG. 3, for use in a normal alert state, is provided with a default setting, it is predictable that the user wishes to have a different countermeasure to be carried out (or not to have a countermeasure to be carried out).

For this reason, in the present embodiment, each user can modify a parameter in the abnormal situation detection vs. countermeasure table, the parameter determining the intimidation action and/or the reporting action to be carried out at the time of detecting an abnormal situation. More specifically, the parameter is modifiable by software, and even in a case where the parameter has been set in advance, it is possible to modify the parameter through communications. By allowing the user to modify the parameter, the abnormal situation detection vs. countermeasure table can be set differently from a default setting thereof. This realizes a vehicle-antitheft service which meets users' preferences.

It is possible to modify the parameter from any of the portable phone 3, the vehicle 2, or the service center 1.

To modify the parameter from the portable phone 3, the user needs to, first, access a service content modification website provided by the service server 6, by using a browser function. Then, after the user is authenticated by, for example, entering an ID and Password, the portable phone 3 displays a modification screen for a service content provided to the user. An example of such a modification screen is shown in FIG. 4. As shown in FIG. 4, the screen indicates a setting of the intimidation action to be carried out, when opening or closing of the door is detected during aforementioned normal mode. According to this example of setting, only beeping of the horn is carried out when the opening or closing of the door is detected. The setting is modified by selecting an item of the intimidation action and clicking on a specific button of the input section 15 that corresponds to the selected item of the intimidation action.

The command for modifying the setting of the parameter from the vehicle 2 is received by the service center 1 via the communication network 4. Then, the service server 6 commands the vehicle 2, via the communication network 4, to modify the setting of the parameter. The control device 8 modifies the parameter of the abnormal situation detection vs. countermeasure table in accordance with the command, so as to determine what intimidation action and/or what reporting action is/are carried out, when an abnormal situation is detected.

The following describes how to modify the parameter from the service server 6. (1) In the vehicle 2, the control device 8 controls the communication device 7 to transmit information obtained by the sensor 9 to the service server 6. (2) Based on the information received from the vehicle 2, the service server 6 suitably transmits, to the vehicle 2, a command for setting the parameter according to the current status of the vehicle 2.

Then, (3) the control device 8 modifies the setting of the parameter of the abnormal situation detection vs. countermeasure table in accordance with the command being transmitted, and determines the intimidation action and/or the reporting action to be carried out when an abnormal situation is detected. For example, the communication device 7 transmits, to the service server 6, positional information or the like of the vehicle obtained by using an in-vehicle GPS antenna. When the service server 6 acknowledges that the vehicle 2 is in the parking of the user's home, the service server 6 takes more precaution against breaking-in of the vehicle than stealing of the vehicle itself, and transmits to the vehicle 2 a command for setting a parameter giving more importance to reporting than intimidation. The communication device 7 receives the command for setting the parameter, and the control device 8 modifies the parameter accordingly to the command, and begins the alert state.

As described, it is possible to cause the service server 6 to automatically modify the parameter, in accordance with a parking location, as well as a parking period and a time when the vehicle 2 is parked. Thus, the user does not have to carry out a complicated operation, and yet the vehicle-antitheft service is most appropriately carried out in accordance with time and location. It should be noted that it is up to the user to decide whether or not to carry out the automatic modification of the parameter from the service server 6. Note further that, if the automatic modification is to be carried out, it is also up to the user to decide, for example, (i) the conditions under which the automatic modification of the parameter from the service server 6 is carried out, (ii) how many times the automatic modification is carried out, and (iii) a period during which the automatic modification of the parameter is carried out. Such decisions can be made via the portable phone 3, and/or the vehicle 2, as in the case of modifying the parameter.

As mentioned above, it is obvious that the modification of the parameter is carried out via the service center 1 in any cases. That is to say that the modification of the parameter is not carried out unless it is permitted by the service center 1.

In the foregoing modification of the parameter, the service server 6 controls an inspection for a case of a complicated parameter setting, any contradictions and/or the like. This is because the service server 6 is capable of controlling the inspection more efficiently than the in-vehicle terminal device whose processing speed and memory is limited. For example, the setting of parameter becomes complicated when setting the parameter taking into account the time and a parking location. For example, the intimidation action is not immediately carried out, while the automobile is parked at the user's home parking, taking into account a possibility of the user's family member making operation mistake. Further, the setting of parameter also becomes complicated in a case of setting a program that increases a level of alert by increasing sensitivity levels of other sensors 9 upon detection of abnormal sound by the microphone. Further, the inspection of the contradiction is, for example, an inspection of a setting carrying out no countermeasure even if an abnormal situation is detected during the vehicle-antitheft service is in effect. When the contradiction is found, then the service server 6 warns the user as such. This warning is carried out by e-mailing the user's portable phone 3. This is however not the only possible warning method.

(Charging Process Associated with Modification of Table)

Next described is a charging process carried out in a service providing system. As mentioned before, the service center 1 carries out the modification of parameter by exchanging information with the vehicle 2 via the communication network 4. The user accesses to the service center 1 from the portable phone 3 or the vehicle 2, so that a command for modifying the parameter is transmitted to the vehicle 2. Since an antitheft system is operated via the service center 1, the service center 1 includes a user data base containing each user's information regarding (i) the number of times parameter modifications are carried out with respect to the abnormal situation detection vs. countermeasure table, (ii) a using status of the vehicle-antitheft service.

The user data base is stored in the charging server 5, and all of the parameter modifications are recorded in the data base. Based on the parameter modifications recorded in the data base, the charging server 5 calculate an amount of charge, and periodically bills the user to pay the charge.

As described, the parameter of the abnormal situation detection vs. countermeasure table is modified upon permission from the service center 1. Charging takes place when the parameter modification is carried out upon permission from the service center 1. In short, the charging server 5 is so arranged that the user is not allowed to modify the parameter without permission (free of charge).

Further, the charging server 5 may carry out the charging process accordingly to a detailed setting of charges based on how long, how many times, and/or where each function of the abnormal situation detection vs. countermeasure table is used. Needless to mention that, the charging process may: allow the modifications to be carried out free of charge as long as the number of times the modifications have been carried out is within a predetermined range of number; and/or allow the modifications to be carried out free of charge during a predetermined period.

(Process in Charging Server)

The following describes an example of the charging process of the present embodiment carried out by the accounting server 5, with reference to a flowchart in FIG. 1. This charging process is carried out on a user-by-user basis.

When the service server 6 controls an operation of the charging server 5, the charging server 5 checks whether or not a predetermined period for the use of the vehicle-antitheft service has expired (S11). Here the predetermined period is a unit period for charging, such as one month.

If the S11 results in "NO"; i.e., the predetermined period has not expired, the charging server 5 checks if there has been an operation for modifying the parameter (S12). If the S12 results in "NO"; i.e., there was no operation for modifying the parameter, then the process goes back to the S11.

If the S12 results in "YES"; i.e., there was an operation for modifying the parameter, then it is confirmed whether or not the vehicle 2 can actually carry out an action corresponding the parameter (S13). This confirmation is carried out because, for example, there is the possibility that a selected countermeasure against an abnormal situation detected by the sensor 9 could not be performed due to a malfunction of the sensor 9 for some reason. This prevents the user from being charged for his/her inadvertent modification of a parameter corresponding to an unavailable action.

If the S13 results in "NO"; i.e., the vehicle 2 is unable to carry out that action, the charging server 5 judges that the parameter modification having been made is invalid, and returns to the S11 after a cancellation process is carried out (S14).

If the S13 results in "YES"; i.e., the vehicle 2 is able to carry out the action corresponding to the modified parameter, the service server 6 transmits modification command data for instructing to modify the requested parameter to the control device 8 of the vehicle 2 (S15). In response to the modification command data, the control device 8 modifies the parameter of the abnormal situation detection vs. countermeasure table stored in the device. Then, in the S16, the charging server 5 stores therein a number of times the parameter modification has been carried out so far, and a content of the modification. After that, the process goes back to the S11, and the process is repeated until the predetermined period expires.

If the S11 results in "NO"; i.e., the predetermined period has expired, the charging server 5 calculates, based on the information stored in the S3, a total number of times the parameter modifications carried out within the predetermined period, upon permission from the service center 1 (S17).

Next, in S18, the charging server 5 determines a valuation for each of the modifications whose total number of times has been calculated. Then, in S19 the charging server 5 calculates a total charge of a basic fee and a fee for the vehicle-antitheft service used during the predetermined period.

Then, the service server 6 requests the user to make a payment (in cash, by a credit card or the like) for the vehicle-antitheft service used during the predetermined period (S20). A billing method may be a conventional method such as mailing, or e-mailing.

(Other Charging Process)

The foregoing description deals with the charging process being carried out by using the accounting server 5, with respect to the parameter modification. However, the charging process can be also carried out, as in the foregoing case, with respect to the following options being added. Here, the option is a function or a device having the function which may be retrofitted to the vehicle 2.

The user is allowed to freely add an option such as a horn for use in intimidation, and/or a new antitheft sensor 9. Each device does not operate by merely connecting it to the in-vehicle terminal device. In order to operate the device, required are: updating of the abnormal situation detection vs. countermeasure table; modification and/or adjustment of the control device 8, and/or other operation.

In the service providing system of the present embodiment, updating of the abnormal situation detection vs. countermeasure table, modification and/or adjustment of the control device 8, and/or other operation is realized by downloading data for use in updating, modification, adjustment, and other operation from the service server 6. This allows the user to use an option via the portable phone 3 or the vehicle 2. Accordingly, the user can purchase an option, and easily improve the in-vehicle terminal device by using a function of the option. Further, it is not necessary to dismount the control device 8 which has already been mounted, for upgrading of the control device 8. This allows a service provider to easily make a change in service provided by the service provider.

The control device 8 may be modified by downloading so that an option can be used for an intended purpose. For example, in a case where the user added a sensor 9, the control device 8 is adjusted by downloading from the service server 6, so as to (i) allow frequent modifications in a setting, and (ii) constantly updating a default status. In a meanwhile, in a case of adding a horn, the control device 8 is adjusted by downloading from the service server 6, so as to enable an adjustment of tone and/or volume in accordance with a purpose.

The charging server 5 charges the user for using these options, and requests the user to pay the charge in the end. Charge collection may be carried out by any of the following charging processes: (I) charging for the use of the option during a limited useable period or at limited number of times; (II) charging a constant fee for a specific option; or (III) charging fees proportional to the number of hours the option has been used. The charging process may also be a process that charges for the use of the option after expiry of its trial period being provided as in the case of charging for shareware. Further, the charging process may be a combination of the foregoing processes.

Further, the service center 1 may provide an option of limiting the use of a function regarding all the functions including a function provided as a standard. This allows the user to temporarily stop a function, stop a function which is not being used, and modify a content of an option. For example, it is possible to temporarily stop notifying a vehicle position in a GPS (Global Positioning System), and/or to suspend image monitoring by means of an in-vehicle camera. The user is allowed to modify a setting of the option, by making a payment for the modification. It is possible to (i) charge the fee every time the option has been used, or (ii) charge the fee for a permission to use the option during a predetermined period. The charging process may be so adapted that the user is allowed to make modifications unlimited number of times during a trial period.

Further, in a case where the service server 6 is capable of sending, to the vehicle 2 (to the user in the vehicle), information such as information of a vacant parking and information of traffic jam, the charging server 5 may carry out, upon receipt of the information, such a charging process in which: a valuation for the information received by the vehicle 2 is determined, and then the determined valuation is charged to the user.

As described, the charging process is carried out by using the charging server 5, with respect to the vehicle-antitheft service as well as the other services likewise.

The service center 1 can provide various options associated with accessories such as answerback sound of a car navigation system and a control panel. For example, the user can download a desirable sound by selecting the sound from various sounds prepared in the service server 6, and use the sound as an operation confirmation sound. Further, by allowing the user to download a sound format, the user can create a sound for use in confirmation of an operation. In this case, the user is obtaining the option by downloading it. As described, the service center 1 provides various options and an environment for using the options via the service server 6. Further, the service center 1 charges the user, via the charging server 5, for using the options thereby collecting the charge from the user.

Further, by downloading data of a browsing function from the service server 6, the user can modify a text and/or a layout displayed on (I) a display section 14 of the portable phone 3 and/or (II) the display/input device 11 of the vehicle 2. To facilitate user's convenience, the user can modify font, modify a system of operation, and/or assign functions to buttons. As a result, the user can modify a control panel of the display/input device 11 in the vehicle 2, and/or a control panel of the portable phone 3. The charging server 5 charges the user for this downloading of data, and requests the user to pay for the charge.

As described, the user is allowed to have the freedom to select an option the user needs, from a remarkably large selection of various options. Further, since it is the charging server 5 that carries out the charging process, a payment can be easily made even if a complicated charging system is set.

Despite the large selection of options, the service provider is able to easily provide the options. This is because the user can download data him/herself, for modifying and/or setting the control device 8.

Further, since it is the user who modifies the parameter and/or downloads data, the service provider is able to provide a service associated with a detailed setting, whereas such a service has conventionally been difficult to provide. Further, the user no longer needs to install, in an in-vehicle terminal device, large amounts of software containing such a function that the user doesn't want. This is advantageous in terms of costs.

Embodiment 2

Another embodiment of the present invention is described below, with reference to FIG. 6. The same symbols are given to the members that have the same functions as those in the foregoing embodiment 1, and the descriptions of those members are omitted here as a matter of convenience.

In the embodiment 1, settlement is carried out, for example, in such a manner that the user pays for the use of a service such as the parameter modification, and addition of an option. The present embodiment deals with a service providing system which allows for settlement of the charge for a service by using a point that the user can earn by providing some kind of information (described later) to the service center 1.

The information provided by the user can be information obtained by using various sensors provided in an automobile 2 owned by the user. For example, speed information obtained by using a speed sensor and an acceleration sensor, image information of a vehicle-surrounding environment obtained by using a CCD camera, and other information have been given in the description of the sensor 9 in the embodiment 1. Additionally, the information provided by the user can be: vehicle-position information obtained by using a GPS; operational information of windshield wiper; operational information of headlight; travel-distance information; remnant gasoline/oil information; and so on. The following describes what kind of information the service center 1 can obtain from the above listed information.

First, the service center 1 can grasp a traffic status, based on the speed information and the vehicle-position information. More specifically, in a case where a speed of the automobile 2 travelling somewhere does not exceed a predetermined speed for a certain period, the service center 1 recognizes an occurrence of a traffic jam in the place where the automobile 2 is travelling. Further, the service center 1 can also estimate time needed to pass the traffic jam, based on the speed at which the automobile 2 is travelling. Thus, by obtaining the speed information and the vehicle-position information, the service center 1 is able to provide other users with detailed traffic information.

Further, the service center 1 can obtain information of a region having rainfall, based on the vehicle-position information and the operational information of windshield wiper. A windshield wiper is basically operated during rainfall. Therefore, by obtaining the information about an operation of a windshield wiper from a plurality of the automobiles 2, it is possible to grasp which region is having rainfall. Here, there is a possibility that a windshield wiper is operated for a purpose of, for example, washing a windshield of the automobile. However, it is possible to make a relatively accurate judgment, by judging that it is raining when, for example, an operation of a windshield wiper lasts a predetermined period or longer.

As described, by obtaining information of raining regions, the service center 1 can (i) provide the other users with weather information in real time, and (ii) predict a traffic jam associated with rainfall.

Further, the service center 1 can obtain information of a region with poor visibility, based on the vehicle-position information, the operational information of headlight, and the image information of a vehicle-surrounding environment. Here, a headlight is usually lit up while the automobile is in a tunnel, as such, the information regarding the headlight becomes irrelevant to the visibility of outside the tunnel, while the automobile is in the tunnel. However, by using the operational information of headlight and the vehicle-position information in combination, it is possible to judge whether or not the automobile is in a tunnel. Therefore, relatively accurate information can be obtained. As described, the service center 1 can obtain information regarding visibility in each region. This allows the service center 1 to provide other users with, for example, information of foggy regions.

Further, the service center 1 can grasp how much gasoline and/or oil is left in the vehicle, based on the remnant gasoline/oil information. Here, under a contract with gas stations, the service center 1 can provide the automobile 2, which has not much gasoline/oil left, with a service, for example, of transmitting information of a gas station nearby the automobile 2, based on a combination of the vehicle-position information and remnant gasoline/oil information. This allows realization of a business model in which the service center 1 provides the foregoing service or the like, by using advertisement fees paid by the gas stations.

Further, the service center 1 can provide a service of, for example, transmitting a message for recommending the user to have the automobile 2 inspected when time has come for inspection, based on (i) the travel-distance information obtained from the automobile 2, and (ii) a history record of a traveling distance at the previous inspection of the automobile 2. In this case, for example, under a contract with an automobile repairing company, the service center 1 can provide an advertisement service of transmitting an advertisement of the automobile repairing company to the automobile along with the message recommending an inspection.

In the foregoing example, the user earns the point by transmitting, to the service center 1, information obtained from various sensors provided in the automobile 2. However, the user may earn the point in exchange for transmitting some kind of information to the service center 1, by inputting the information via a portable phone 3 or a display-input device 11 in the automobile 2.

For example, in driving the automobile 2, the user can inform the service center 1 of a travelling purpose and/or a travelling area. Examples of the travelling purpose are travelling for leisure, or travelling for a business trip, and so on. Information of the travelling area can be a planned travelling route, a destination, or a facility planned to be used. Based on such information obtained by the service center 1, the service center 1 can provide various advertisements to the user in line with the respective travelling purposes, and travelling areas, thereby profiting from the advertisements.

As described, an advertisement is provided based on information (e.g. remaining gasoline information, information related to the travelling purpose, and/or the like) transmitted from the user. This causes a higher possibility of the user utilizing a service being advertised. This brings an advantage that the effect of advertisement increases to an advertisement providing side. Further, it is advantageous for the user, because the user is allowed to: (I) receive an advertisement of a shop located in an area where the user can reach with a remaining amount of gasoline; and (II) receive a beneficial advertisement (such as an advertisement of a restaurant) selectively in accordance with a travelling time of day and the travelling purpose.

It should be noted that the foregoing description deals with the case where the user can earn the point by providing some kind of information to the service center 1. However, the user may also earn the point by performing a setting for permitting a receipt of the advertisement.

(Process in Charging Server)

Figure 6:
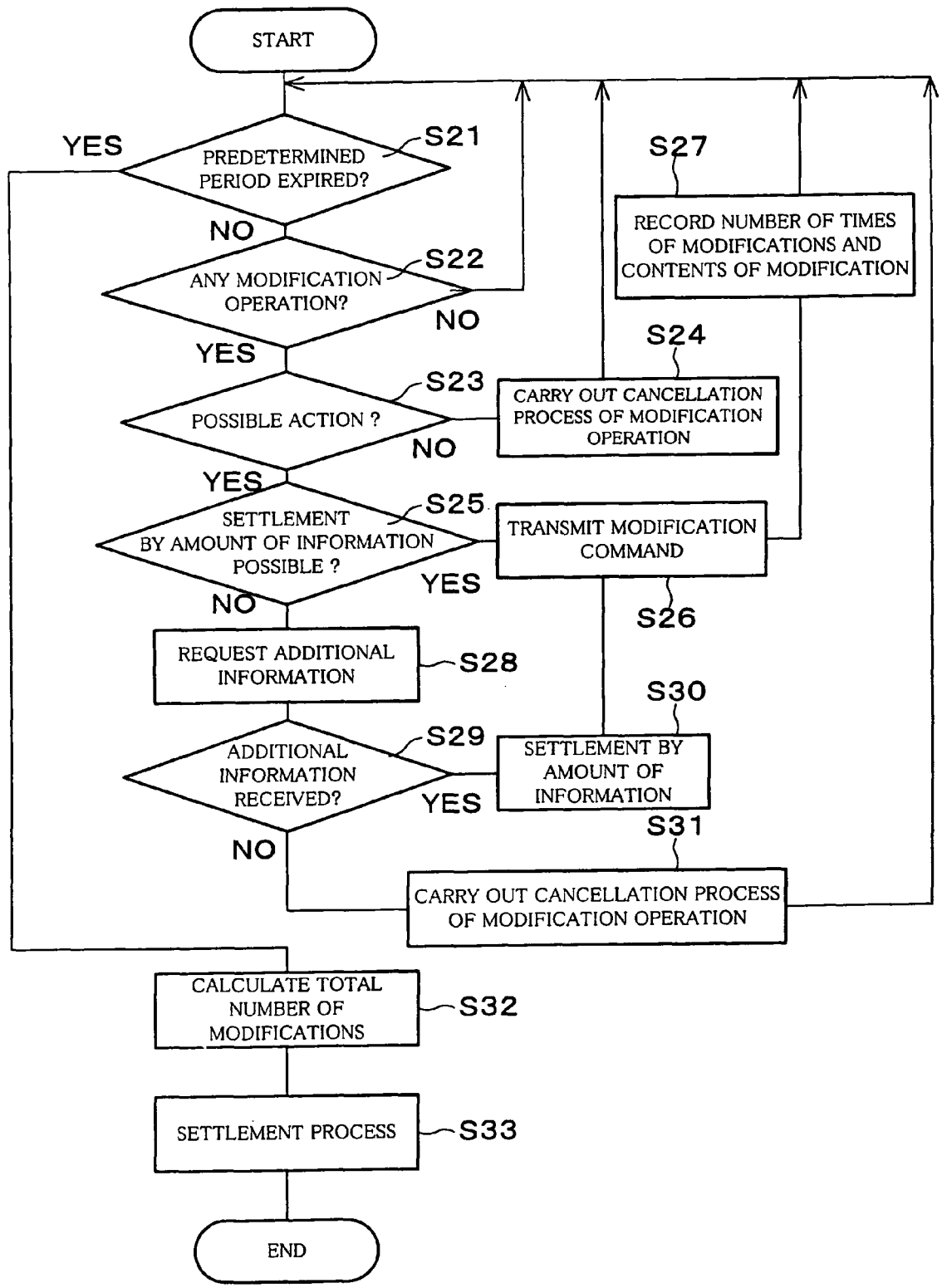
FIG. 6 is a flowchart showing another example of the charging process in the service providing system according to one embodiment of the present invention.

Next described, with reference to a flowchart shown in FIG. 6, is a flow of a process carried out in a charging server, at the time of offering the foregoing service.

When the service server 6 controls an operation of the charging server 5, the charging server 5 checks whether or not a predetermined period for the use of the vehicle-antitheft service has expired (S21).

If the S21 results in "NO"; i.e., the predetermined period has not expired, the charging server 5 checks if there has been an operation for modifying the parameter (S22). If the S22 results in "NO"; i.e., there was no operation for modifying the parameter, then the process goes back to the S21.

If the S22 results in "YES"; i.e., there was an operation for modifying the parameter, then it is confirmed whether or not the vehicle 2 can actually carry out an action corresponding the parameter (S23). This confirmation is carried out because, for example, there is the possibility that a selected countermeasure against an abnormal situation detected by the sensor 9 could not be performed due to a malfunction of the sensor 9 for some reason. This prevents the user from being charged for his/her inadvertent modification of a parameter corresponding to an unavailable action.

If the S23 results in "NO"; i.e., the automobile 2 is unable to carry out the action, the charging server 5 judges that the parameter modification having been made is invalid, and returns to the S21 by carrying out a cancellation process (S24).

If the S23 results in "YES"; i.e., the parameter modification can be carried out in the automobile 2, then it is judged, in S25, whether or not a charge to the user can be settled by using the amount of information provided by the user. This is for judging whether or not the number of points required for carrying out the requested modification of the parameter is not more than the number of points possessed by the user at that time. In other word, it is judged whether or not the user has provided enough information for carrying out the requested modification of the parameter.

If the S25 results in "YES"; i.e., the charge can be settled by using the amount of information provided by the user, then modification command data for instructing modification of the parameter is transmitted from the service server 6 to a control device 8 of the automobile 2 (S26). In response to the this modification command data, the control device 8 modifies the parameter of an abnormal situation detection vs. countermeasure table stored in the device. Then, in S27, the charging server 5 stores therein the number of times the parameter modification has been carried out, and a content of the modification. After that, the process goes back to the S21, and the process is repeated until the predetermined period expires.

On the contrary, if the S25 results in "NO"; i.e., the amount of the information provided by the user is not enough to settle the charge, the user is requested to provide additional information. For example, a message is sent to the user's portable phone 3, mentioning that the requested modification of the parameters would be carried out if the user provides some kind of information because the amount of information provided by the user is not enough so far.

Then, in S29, it is judged whether or not additional information has been received. If the user gives, after reading the message, an instruction to provide some kind of information, then the additional information is received by the service server 6 ("YES" in the S29), and the charge is settled in S30 by using the amount of the information provided. If settlement of the charge has properly completed, in the S26, modification command data for modifying the parameter concerned is transmitted from the service server 6 to the control device 8 of the automobile 2. Then, in the S270, the charging server 5 stores therein the number of times the parameter modifications have been carried out, and contents of the modification, and returns to the S21.

On the contrary, if the S29 results in "NO", i.e., the additional information is not obtained from the user, in S31, the charging server 5 judges that the requested parameter modification is not valid, and returns to the S21 by carrying out an cancellation process.

In a meanwhile, if the S21 results in "NO"; i.e., the predetermined period has expired, the charging server 5 calculates, based on the information stored in the S27, a total number of times the parameter modifications carried out within the predetermined period, upon permission from the service center 1 (S32). Then, in S33, a settlement process is carried out, based on a calculation result obtained in the S27.

Note that, in a case where the charging server 5 judges that the information transmitted from the automobile 2 is not enough for settling the charge, it is possible to settle the charge by (i) generating a deficit of points so that the deficit is settled in the next settlement, and/or by (ii) requesting the user to make a payment in cash, by credit card, or the like method. As described, the charging is possible not only by information exchange but also by combination of information exchange and a charge of a valuation for information.

The service center 1 handles managements of such information exchange, managing parameter modification process, and other operation, so that it is possible to realize a single cohesive system into which information exchange and a charging process for a use of an application are combined. In other words, a direct information exchange system is realized in such a manner that the automobile 2 transmits information via an in-vehicle terminal device, although the automobile 2 has only received conventionally, and the transmitted information is given a value (point) in accordance with a type of the information.

However, it is not necessary to give a constant value to each piece of information, and it is possible to realize a system that allows the user to receive information the user wants in exchange for information of the user. Further, it is possible to realize a setting that allows the user to use a predetermined option unlimited number of times, even if the user provides no information.

In the present embodiment, exchanging of the information becomes possible when a predetermined value is accumulated in response to user's setting indicating that the user will provide some kind of information. This is however not the only possibility. For example, information exchange may be such that (i) a value is accumulated at the time of actual transmission of information from the communication device 7, so that the information transmitted can be exchanged with a desired information. Alternatively, information exchange may be such that (ii) a value is accumulated in accordance with the amount of information having been transmitted, so that the information transmitted can be exchanged with a desired information. Further, a combination of the (i) and (ii) may be adopted.

Embodiment 3

Yet another embodiment of the present invention is described below, with reference to FIGS. 7 through 15. The same symbols are given to the members that have the same functions as those in the foregoing embodiments 1 and 2, and the descriptions of those members are omitted here as a matter of convenience.

In the present embodiment, there is provided a detailed description of the parameter modification process, described in the foregoing embodiments 1 and 2, and processes accompanying therewith. Note that, in the present invention, the parameter modification includes adding and updating of a control program.

As described in the embodiment 1, upon receipt of a request, from the user, for modifying the parameter determining an operation of the control device (first terminal device) 8 in the automobile 2, the service server (service providing server) 6 of the service center 1 transmits a modification command corresponding to the request to the control device 8. Upon receipt of the modification command from the service server 6, the control device 8 modifies the parameter as instructed by the modification command. Note that the parameter modification process may be carried out from any of the (i) the portable phone (second terminal device) 3 of the user, (ii) the automobile 2, and (iii) the service center 1.

Further, the charging server (service providing server) 5 of the service center 1 stores therein history of the modification command on a user-by-user basis, and determine a valuation for modification made at predetermined periods so as to charge a usage fee to the user As described, under any circumstances, the parameter modification process of the control device 8 provided in the automobile 2 is carried out via the service center 1. In other words, the parameter modification is not carried out unless it is permitted by the service center 1.

Then, along with the parameter modification process, the service center 1 carries out an auxiliary process such as an inspection to be carried out upon occurrence of a complicated parameter setting, contradiction, and/or the like. This improves the usefulness of the service center 1, and is more advantageous for the user.

Figure 7:
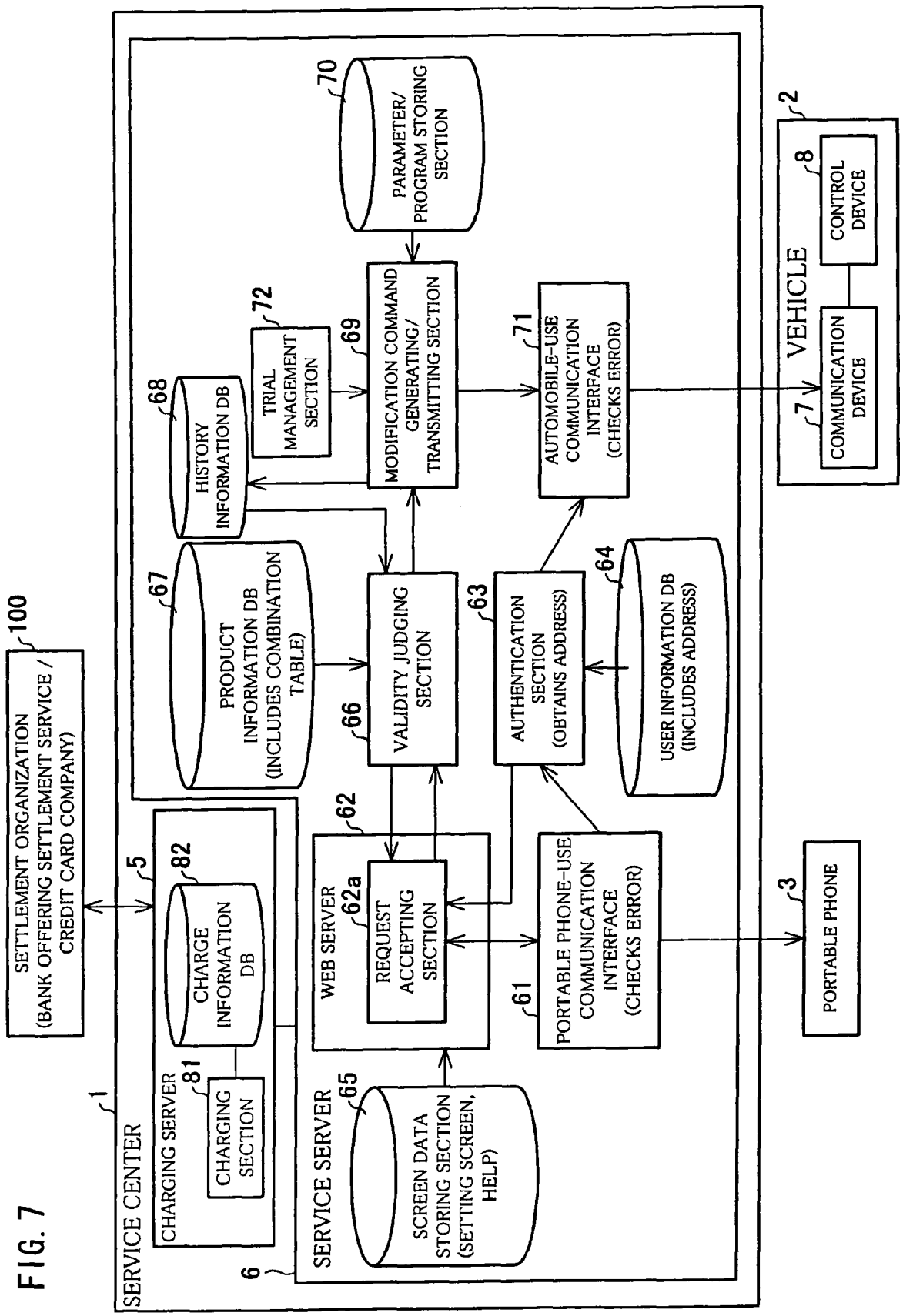
FIG. 7 is a block diagram showing a detail arrangement of a service server and a charging server in the service providing system according to one embodiment of the present invention.

FIG. 7 is a functional block diagram illustrating in detail arrangements of the service server 6 and the charging server 5 provided in the service center 1.

The service server 6 is provided with: a portable phone-use communication interface 61 (hereinafter simply referred to as a portable phone-use communication IF 61); a web server 62; an authentication section 63; a user information database 64 (hereinafter referred to as user information DB 64); a screen data storing section 65; a validity judging section 66; a product information database 67 (hereinafter referred to as product information DB 67); a history information database 68 (hereinafter referred to as history information DB 68); a modification command generating/transmitting section 69; a parameter/program storing section 70; a automobile-use communication interface 71 (hereinafter referred to as automobile-use communication IF 71); and a trial management section 72.

The portable phone-use communication IF 61 is an interface for use in communicating with the portable phone 3. Note that the portable phone-use communication IF 61 checks an error during communications with the portable phone 3.

The web server 62 transmits data for causing the portable phone 3 of the user to display a setting screen and a help message in the parameter modification process, and obtains a modification request entered by the user via the setting screen. More specifically, from the screen data storing section 65, the web server 62 obtains data of the setting screen and/or the help message in response to the request from the portable phone 3, and then transmits the obtained data to the portable phone 3. Further, the web server 62 is provided with a request accepting section 62a for obtaining a modification request entered by the user via the setting screen displayed on the portable phone 3.

The authentication section 63 requests the user to enter a password and an ID of the control device 8 (control device identifying information), upon receipt of a request for an access to the parameter modification process from the portable phone 3. Then, the authentication section 63 confirms that the request for the access is made by an authenticated user, with reference to the user information database 64. At this point, the authentication section 63 refers to the user information DB 64 to obtain addresses of the communication device 7 in the automobile 2, based on the inputted ID of the control device 8. Then, the authentication section 63 transmits the addresses to the automobile-use communication IF 71.

The user information DB 64 stores therein information about a user to which a service is provided. More specifically, the user information DB 64 stores therein a user password and an address of each communication device 7 in the control device 8 of the automobile 2. Note that the portable phone 3, which is used by the user for modifying the parameter of the control device 8, may be registered, in advance, in the user information DB 64. This allows the authentication section 63 to authenticate the portable phone 3 based on the phone number of the portable phone initiating the communication, thereby identifying the control device 8 whose parameter is targeted for the modification, and obtaining the address of the communication device 7.

The screen data storing section 65 stores therein the setting screen and/or the help message to be displayed on the portable phone 3 in the parameter modification process.

The validity judging section 66 receives a setting requested by the user, via the request accepting section 62a, and refers to the product information DB 67 and the history information DB 68, so as to judge the validity of the request; i.e., so as to judge whether or not modification as requested will cause a contradiction. If there is a problem with the setting requested by the user, the validity judging section 66 causes the request accepting section 62a to notify the mobile phone 3 as such.

The product information DB 67 stores therein information specifying whether a combination of optional devices, such as a sensor 9 and an intimidation device 10, being set in the control device 8 is valid or not in terms of design. This information can be, for example, a combination-table (See FIG. 8) determining each combination being set as (i) permitted, (ii) permitted but not recommended, or (iii) not permitted.

The history information DB 68 stores therein a user-specific parameter modification histories of the control device 8 (See FIGS. 9 and 10). Note that FIGS. 9 and 10 illustrates identical parameter modification history in different formats. The validity judging section 66 obtains a current setting of the control device 8 in accordance with the history information DB 68.

The modification command generating/transmitting section 69 generates modification command data to be transmitted to the control device 8, when the validity judging section 66 judges that the setting requested by the user is valid. Then, the modification command generating/transmitting section 69 causes the automobile-use communication IF 71 to transmit the modification command data. At this point, the modification command generating/transmitting section 69 obtains necessary parameter and program from the parameter/program storing section 70 and then generates the modification command data including the obtained parameter and/or program. Further, the modification command generating/transmitting section 69 stores, in the history information DB 68, the contents of the modification associated with (i) the control device 8 and (ii) a date on which the modification is carried out. Note that the recording of the modification in the history information DB 68 may be carried out after receiving of a modification completion notification from the control device 8.

The parameter/program storing section 70 stores therein the parameter and/or the program to be: (i) transmitted as the modification command data, to the control device 8; and (ii) stored in a memory or the like of the control device 8.

The automobile-use communication IF 71 is an interface for carrying out communications with the communication device 7 of the automobile 2. The automobile-use communication IF 71 transmits the modification command data generated in the modification command generating/transmitting section 69, to the communication device 7 whose address is specified by the authentication section 63. It should be noted that the automobile-use communication IF 71 carries out an error check during the communications with the communication device 7 of the automobile 2.

Note further that a description of the trial management section 72 is provided later.

Further, the parameter modification process may be carried out from any of (i) the portable phone 3 of the user, (ii) the automobile 2, and (iii) the service center 1. Regardless of whether (i) the parameter is modified accordingly to a request from the automobile 2, or (ii) the parameter is modified accordingly to a request from the service center 1, the modification command data is generated by the modification command generating/transmitting section 69, upon validation of the request by the validity judging section 66, and is transmitted to the control device 8, while the history of the parameter modification is stored in the history information DB 68.

Further, the charging server 5 is provided with a charging section 81 and a charging database 82.

The charging section 81 refers to user-specific parameter modification histories stored in the history information DB 68, so as to determine a valuation for the modification at predetermined periods and then charge a usage fee to the user. Then, the charging server 81 manages information on charging and payment status on the user-by-user basis, in the accounting database 82. It should be noted that the charging section 81 may request a computer of the settlement organization 100 to settle the charge to the user.

The following describes operations of the above-arranged service server 6 and accounting server 5 in the service providing system of the present embodiment, assuming that the control device 8 is an in-vehicle device of a vehicle-antitheft system.

(Option Selecting Screen)

FIG. 11 is an explanatory diagram illustrating an example of an option device selecting screen displayed on the portable phone 3. FIG. 11 illustrates an example of a screen from which the user selects an option device so as to cause the control device 8 to load a parameter and/or a program for operating the option device provided in the automobile 2. Note that the control device 8 is unable to operate the option device without an appropriate setting of the parameter and/or the program.

In the foregoing service providing system, the web server 62 retrieves a screen to be displayed on the portable phone 3, from the screen data storing section 65, and transmits the screen data to the portable phone 3. A service provider can flexibly prepare an appropriate operation screen, so that the user can select a setting without being confused, even if a combination of option devices is complicated.

Thus, in the foregoing service providing system, a GUI (Graphical User Interface) of the portable phone 3 is mounted in the service server 6. This allows a system to be built in an environment in which regulation on capacity is relatively light. Further, it is possible to provide a screen suitable for the portable phone 3. Further, from the setting screen, the user can make a reference to a help-window for setting, and/or supplemented information. Further, it is possible to provide the users information of a recommended option as well as an advertisement.

Figure 12:
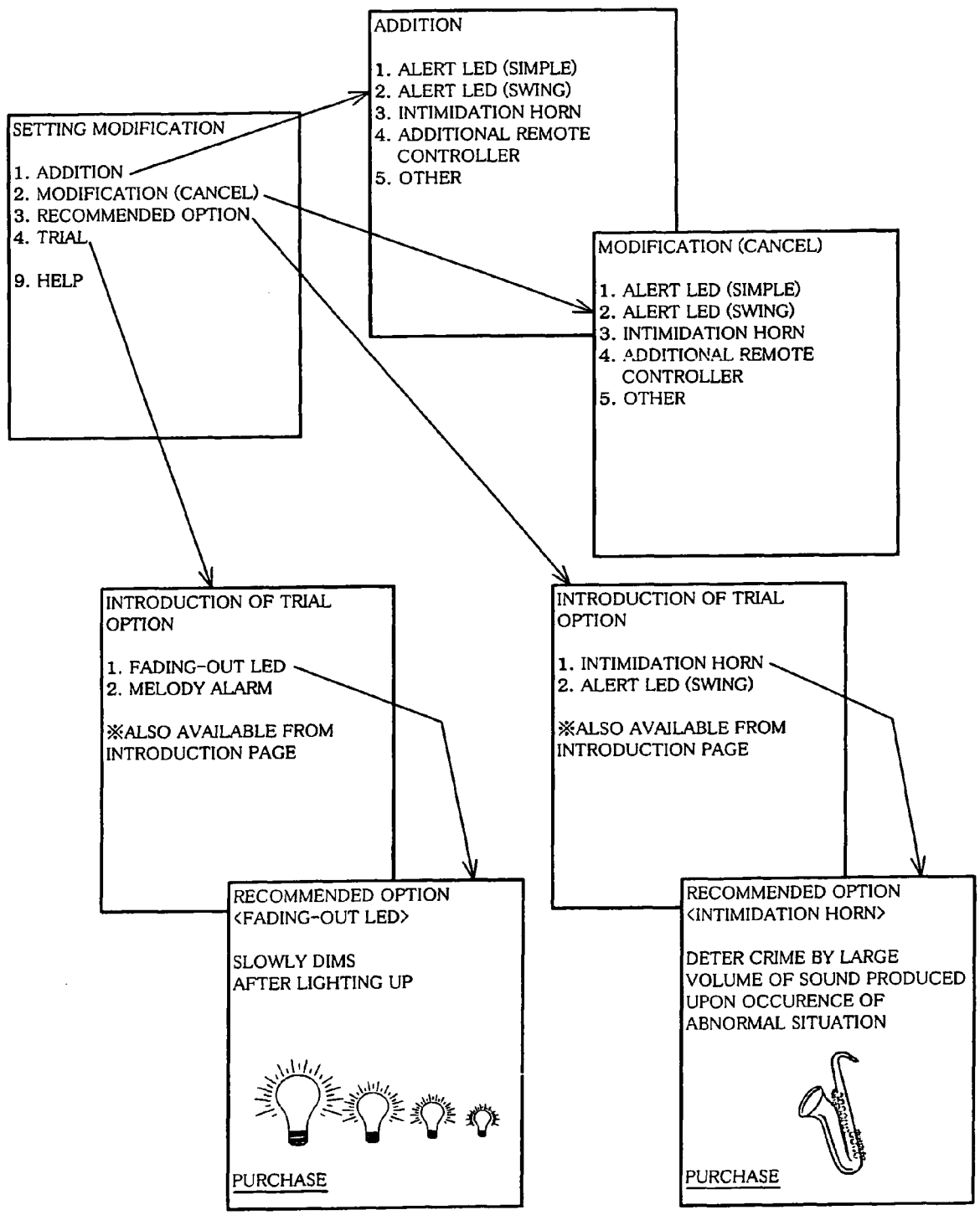
FIG. 12 is an explanatory diagram showing another example of the option selecting screen displayed on the portable phone connected to the service server shown in FIG. 7.

FIG. 12 is an explanatory diagram illustrating another example of the option device selecting screen displayed on the portable phone 3. As shown in FIG. 12, it is possible to provide information by using a simple illustration and/or a photograph of a commodity. This allows the user to easily grasp the detail of the options. Further, in cooperation with an on-line shopping site, the user can place an order of an option device from this page.

(Setting Validity Judgment)

Further, in the foregoing service providing system, the validity judging section 66 validates the setting requested by the user, in accordance with the combination-table (FIG. 8) in the product information DB 67. This avoids an inappropriate setting, even if the user requests a setting overlapping with another setting and/or a setting that does not function while another setting is functioning. Further, by simply updating the product information DB 67, it is possible to address a case of finding an inappropriate combination of settings, or a case where a new option device is put on sale.

Further, since the history of the modification is stored in the history information DB 68 (See FIGS. 9 and 10), it is possible to judge validity of a requested modification, based on the setting of the control device 8. Further, in a case where the user reports a problem, it is possible to identify an inappropriate combination of settings by checking the setting of the control device 8. This inappropriate combination being identified can be added to the combination-table in the product information DB 67.

Further, it is possible to carry out, for example, (i) a minute adjustment of the parameter and (ii) version-upgrading of a control program, simply by storing a new parameter and/or a program in the parameter/program storing section 70.

(Modification History)

Further, in the foregoing service providing system, the current status, a history of modifications, or the like record are stored in the history information DB 68 (See FIGS. 9 and 10), every time the modification command generating/transmitting section 69 transmits the modification command corresponding to a setting being selected by the user.

Therefore, it is possible to judge a successive modification in accordance with the history information, and/or extract information regarding the charging.

Figure 13:
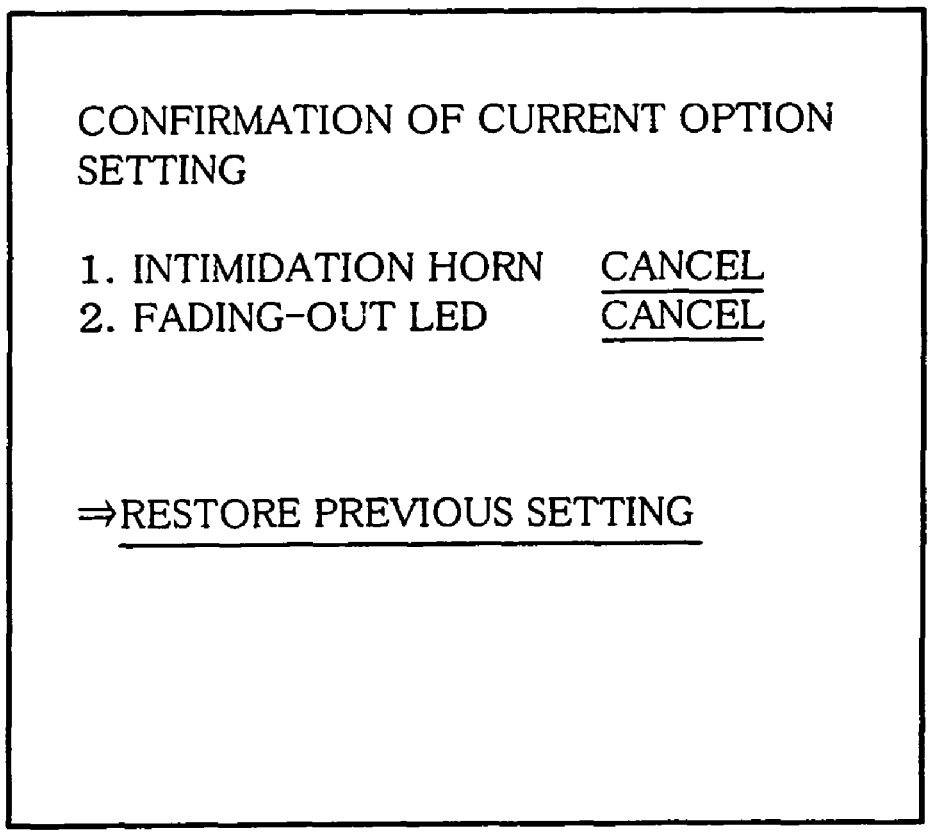
FIG. 13 is an explanatory diagram showing an example of a current status confirmation/modification screen displayed in the portable phone connected to the service server shown in FIG. 7.

Further, based on the history information, it is possible to bring back a past setting through an operation via a screen shown in FIG. 13. In other word, it is possible to provide a service of restoring a former setting, if a new setting after the modification does not meet the user's preference. A period during which the setting can be restored may be limited to a certain period after use of a service is started. This allows the service provider to promptly carry out a refund process after confirmation of the suspension of the function.

(Charging)

Further, in the foregoing service providing system, no function is useable in an initial setting of the control device 8. Upon completion of charging procedure in the service center 1, the service server 6 sends data of a setting that enables the user to use the control device 8. This allows the service center 1 to accurately manage a status of providing services.

Further, the accounting section 81 can charge fees, in accordance with a using-time of each function, obtained from the history information DB 68. Further, in a case of a problem, it is possible to identify the function being used, and verify the cause of the problem. Further, by confirming a using status of the identical setting used by another user, the service provider can extract information needed for finding out the cause of the problem. Thus, appropriate supporting information is promptly provided to the user.

Further, when confirming that the user paid a fee charged for using the control device 8, the charging section 81 may transmit service-continuation permission information to the control device 8, via the automobile-use communication IF 71. Thus, in a case where the control device 8 has not received the service-continuation permission information for a predetermined period, it is possible to cause the control device 8 to carry out a predetermined operation. For example, such a predetermined operation can be an operation that causes the control device 8 to stop functioning after indicating a warning message.

(Trial Period)

Figure 14:
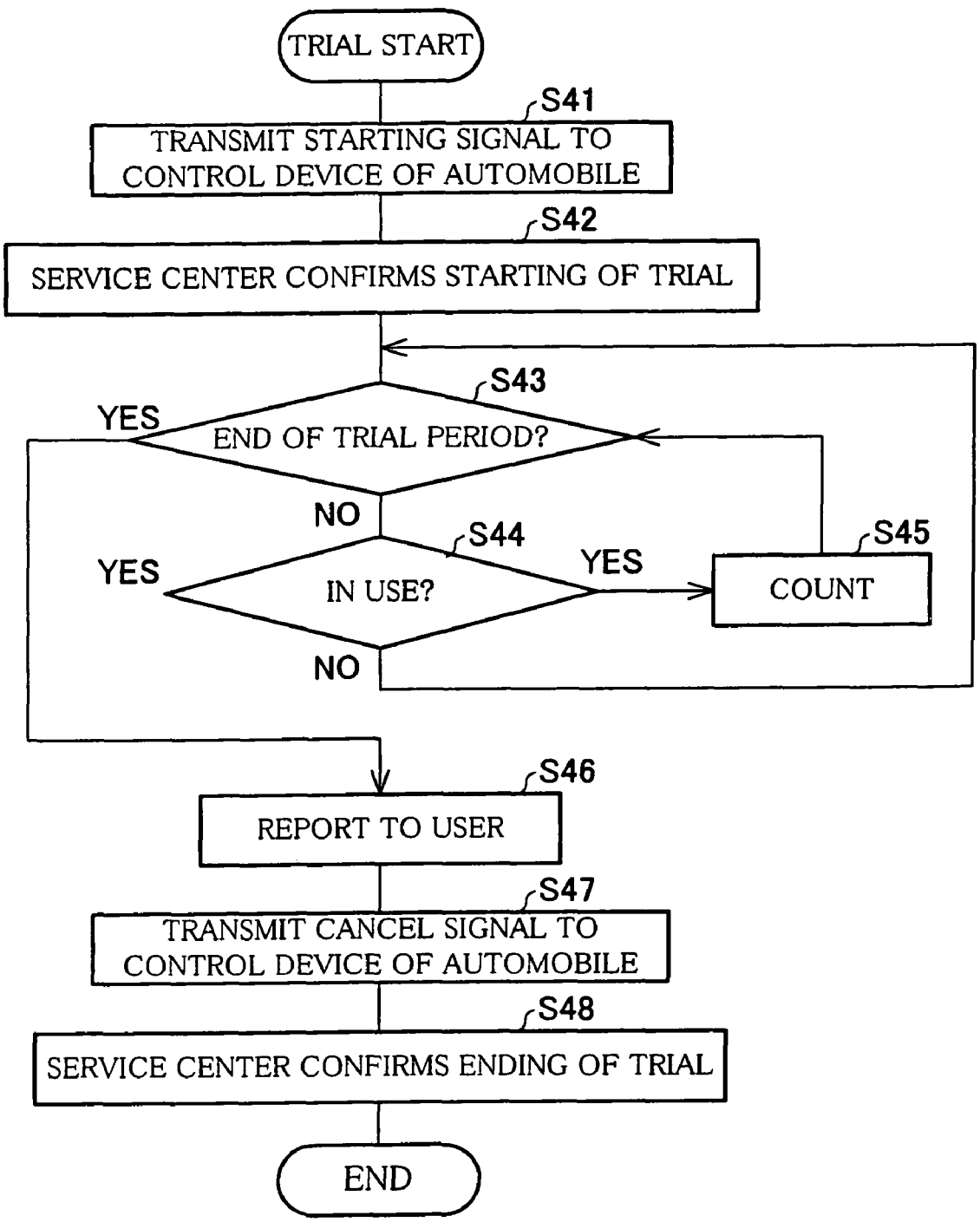
FIG. 14 is a flowchart schematically showing a process during a trial period in the service server shown in FIG. 7.

FIG. 14 is a flowchart of a process for a trial period. In this process for the trial period, the service server 6 automatically controls the control device 8, so as to allow a user to use a function by validating a setting of the control device for a predetermined period. Note that the process is carried out by the trial management section 72 in the service server 6. Further, after the trial period has elapsed, the setting is brought back to a state before the trial period in accordance with the history information of the history information DB 68.

As shown in FIG. 14, when the user selects a trial option (See FIG. 12), the trial management section 72 causes the modification command generating/transmitting section 69 to transmit, to the control device 8 of the automobile 2, a start signal for validating a function of the trial option being selected (S41). At this point, the starting of the trial is recorded in the history information DB 68. The service server 6 confirms the starting of the trial by receiving a signal notifying completion of the setting from the control device 8 (S42).

Next, the trial management section 72 judges whether or not the trial period has ended based on a timer (not shown) (S43). If the trial period has not ended ("NO" in the S43), then it is judged whether or not the option is being used with reference to the history information DB 68 (S44). If the option is being used ("YES" in the S44), then the number of days of using the option is counted (S45).

Next, when the count of the days that the option has been used reaches the end of the trial period ("YES" in the S43), the trial management section 72 notifies the user of the end of the trial period, and transmits, to the control device 8 of the automobile 2, a cancel signal for invalidating the function of the option (S47). At this point, the modification command generating/transmitting section 69 transmits the modification command data for bringing back the setting to the setting before the trial period, in accordance with the history information in the history information DB 68. At the same time, the history information DB 68 records therein the ending of the trial. The service server 6 confirms the ending of the trial by receiving a signal notifying completion of the setting from the control device 8 (S42).

As described, in the service providing system of the present embodiment, the user accesses to the service server 6 to request the modification of the parameter of the control device 8. Then, the service server 6 performs communications with and modification to the control device 8.

As described, with the use of the service server 6 for managing a state of providing services, confirming the current status of the control device 8, and/or checking the contents of modification, it is possible to carry out more secured modification work. Further, it is possible to provide users with: a large selection; newly added functions; and/or auxiliary information such as information of each option, and information regarding combinations of these options. The foregoing functions are provided in the service server 6 data capacity of which is less limited, rather than an in-vehicle device (control device 8) or a user's communication terminal (portable phone 3) data capacities of which are limited. Therefore, it is possible to provide a large volume of data and application.

Of course, depending on a spec of an application in the control device 8, the user may be able to modify the control device 8 by using the application. However, such modification is the same as modification of a setting directly carried out by using a DIP switch or a menu provided in a conventional in-vehicle device. Therefore, it is difficult to carry out the modification other than selecting a function being set in advance. Further, in a case of using switches, it is necessary to explain functions of the respective switches. This is not preferable for users. Further, in a case of using a menu displayed on an LED panel or the like, it is possible to support the user by providing the auxiliary information using texts or an icon. This is convenient for the user. However, depending on where the control device 8 is installed, the menu may be difficult to be seen. Further, a size of the menu will be limited, thus causing a difficulty to read the menu.

Further, storing of choices of parameter and the auxiliary information in the control device 8 causes an increase in the cost due to a volume of the program and the data.

Further, the setting through the wireless communications may be interrupted or may not be completed due to a temporary deterioration in a communication status. The foregoing problem is generally addressed in the form of software by improving an application for use in communications. On the contrary, in the foregoing service providing system, communication errors are checked by the portable phone-use communication IF 61 and the automobile-use communication IF 71.

Figure 15:
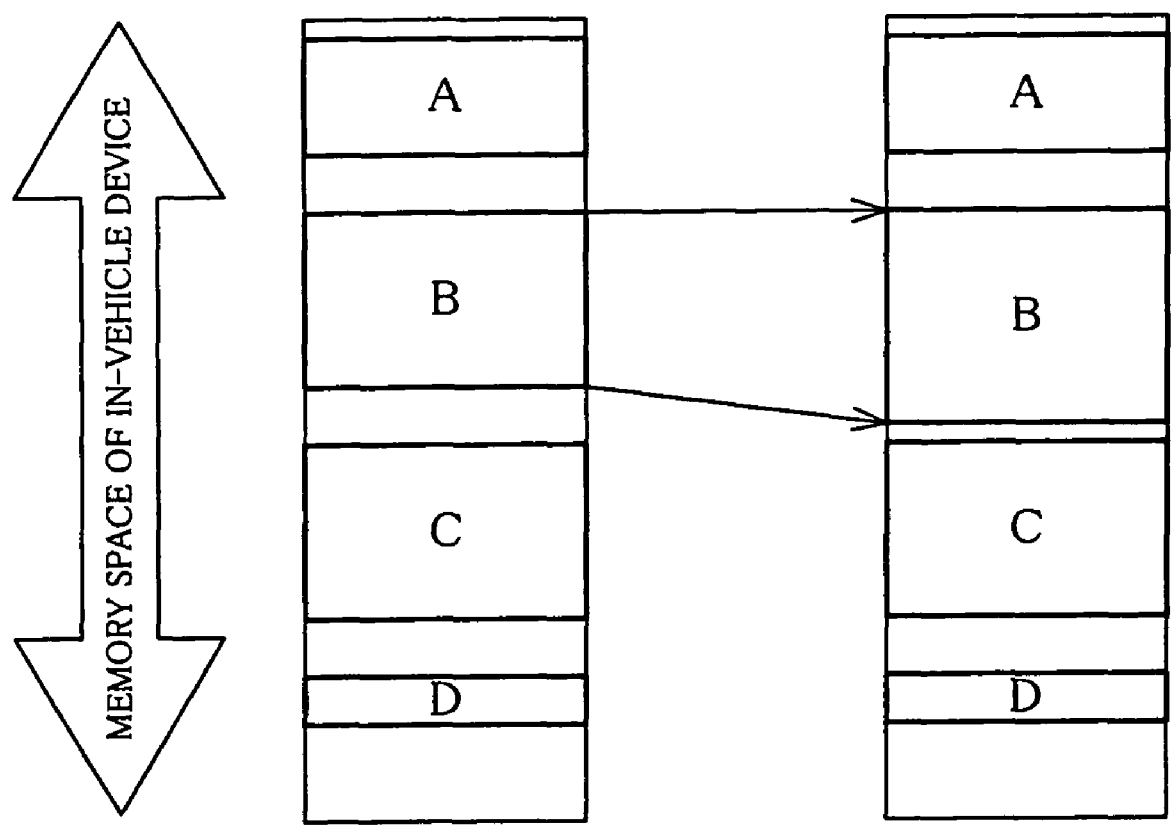
FIG. 15 is an explanatory diagram showing an arrangement of programs in a memory space of a control device to which a program is supplied from the service server shown in FIG. 7.

Further as shown in FIG. 15, the control device 8 is provided with a blank region in a memory, so that a partial modification of a program does not cause a change in a position of another program in the memory space.

The invention being thus described, it will be obvious that the same way may be varied in many ways. Such variations are not to be regarded as a departure from the spirit and scope of the invention, and all such modifications as would be obvious to one skilled in the art are intended to be included within the scope of the following claims.

A charging method of the present invention is a charging method for use in a service providing system having (a) a first terminal device owned by a user and (b) a service providing server, connected to the first terminal device via a communication network, offering an information providing service to the first terminal device, the method comprising: (I) a step of a service providing server transmitting, to the first terminal device, a modification command for modifying a predetermined parameter determining an operation of the first terminal device; (II) a step of the first terminal device modifying the predetermined parameter only when the first terminal device receives the modification command for modifying the predetermined parameter from the service providing server; and (III) a step of the service providing server charging the user owning the first terminal device a fee for the transmission of the modification command for modifying the predetermined parameter, in a case where the service providing server transmits, to the first terminal device, the modification command for modifying the predetermined parameter.

With the foregoing method, the modification of the predetermined parameters determining the operation of the first terminal device owned by the user is not carried out unless the service providing server gives the modification command. That is to say that, without permission from the service providing server, the user is not able to modify the predetermined parameters determining the operation of the user's first terminal device. When the service providing server gives the first terminal device a command for modifying the predetermined parameters, the user who requested the modification is charged a fee.

Thus, there is realized a business model in which a user is charged for modification of a predetermined parameter determining an operation of a first terminal device owned by the user. More specifically, a service provider managing the service providing server is able to ensure income from the foregoing business model. By using this income, the service provider can provide various information services or the like at a low price, or even provide them free of charge. As a result, it is possible to realize an information service system that can also benefit users as well.

Further, the foregoing charging method of the present invention for use in the service providing system may be so adapted that, upon receipt of a request for modifying the predetermined parameter from the user, the service providing server transmits, to the first terminal device owned by the user, the modification command for modifying the predetermined parameter in accordance with a content of the received request.

In the foregoing method, the user makes a modification request to the service providing server, whenever the user wishes to modify the predetermined parameter determining the operation of the user's first terminal device, the service providing server then gives a command for modifying the predetermined parameter. With this method, the user is enabled to change a parameter determining the operation of the first terminal device into a desirable state, and the service providing server is enabled to reliably manage such modifications.

Further, the foregoing charging method of the present invention for use in the service providing system may be so adapted that a second terminal device which is different from the first terminal device is owned by the user, the second terminal device being connected to the service providing server via a communication network; and the request for modifying the predetermined parameter to the service providing server is made by the user by means of the second terminal device.

With the foregoing method, the user can use the second terminal device, which is different from the first terminal device, for requesting modification of a parameter with respect to the service providing server, via communicating means of the second terminal device. Here, for example, with a use of a portable terminal (e.g. portable phone) owned by the user as the second terminal device, the user can easily request modification of a parameter, whenever the user thinks it is necessary to modify the parameter. Further, for example, with a use of a PC (Personal Computer) or the like owned by the user as the second terminal device, the user can also request modification of a parameter, while the user is operating the PC at home, or at work.

Further, the foregoing charging method of the present invention for use in the service providing system may be so adapted that, in offering a service of providing information to the first terminal device, the service providing server charges the user owning the first terminal device a fee for the service offered.

In the foregoing method, the user is charged, when the service providing server offers the information providing service with respect to the first terminal device. In other words, the service providing server charges the user for modification of the parameters, as well as the information providing service. This allows the user to pay the charge for the modification of the parameter, and the charge for the information providing service, at the same time.

Further, the foregoing charging method of the present invention for use in the service providing system may further include: (IV) a step of the service providing server, when the first terminal device owned by the user transmits certain information to the service providing server, rewarding the user with one or more points, the points varying in number depending on information received; and (V) a step of the service providing server using at least one of the points owned by the user for settlement of the charge to the user.

In the foregoing method, the user can earn a point by transmitting certain information from the first terminal device to the service providing server. The point being earned is used in making a payment for the parameter modification or the like. This realizes so-called "bartering of information" in which the user receives the information providing service from the service providing server in exchange of providing certain information to the service providing server. Accordingly, for example, the user can receive, from the service providing server, the information providing service substantially free of charge, by providing a sufficient amount of information to the service providing server.

Further, the foregoing charging method of the present invention for use in the service providing system may be so adapted that: the first terminal device is an in-vehicle terminal device provided in an automobile owned by the user, and the predetermined parameter is a parameter determining an operation of the in-vehicle terminal device in a vehicle-antitheft system.

With the foregoing method, it is possible to establish a business model of a vehicle-antitheft service, in which modification of a parameter determining an operation of a vehicle-antitheft system operated by an in-vehicle terminal device is carried out upon permission from the service providing server. In many cases, the vehicle-antitheft service is provided by collecting an enrollment fee and a monthly membership fee. However, as described, it is possible to charge users for modification of parameters, so that a new source of income is ensured for the service provider. Further, for example, with a use of a system that allows the user to earn at least one point for providing information, it is possible to obtain various kinds of information from the user. Thus, it is possible to provide not only the vehicle-antitheft service, but also wider range of information providing services.

Further, the foregoing charging method of the present invention for use in the service providing system may be so adapted that the predetermined parameter is a parameter identifying a type of intimidation action and/or reporting action to be carried out when a sensor provided in the automobile detects an abnormal situation.

With the foregoing method, it is possible to modify the parameter for specifying the type of intimidation action and/or reporting action to be carried out when the sensor provided in the automobile detects an abnormal situation. Accordingly, it is possible to provide a vehicle-antitheft service which is more delicately settable in accordance with the needs of the user.

Further, a service providing server of the present invention is a service providing server for carrying out the foregoing charging method of the present invention, for use in the service providing system.

Thus, it is possible to provide a service providing server that realizes the charging method of the present invention, for use in the service providing system.

Further, a service providing program of the present invention is a service providing program for causing a computer to execute a process in the foregoing service providing server of the present invention.

By loading the foregoing program to a computer system, it is possible to realize the foregoing service providing server.

Further, a storage medium of the present invention contains a service providing program of the present invention for causing a computer to execute a process in the service providing server.

By loading the foregoing program recorded in the storage medium to a computer system, it is possible to realize the foregoing service providing server.

Further, a terminal device of the present invention is a terminal device for carrying out the charging method of the present invention, for use in the service providing system.

Thus, it is possible to provide a terminal device that realizes the charging method of the present invention, for use in the service providing system.

Further, a terminal processing program of the present invention is for causing a computer to execute a process in the terminal device of the present invention.

By loading the foregoing program to a computer system, it is possible to realize the foregoing terminal device.

Further, a storage medium of the present invention containing the terminal processing program of the present invention contains the terminal processing program for causing a computer to execute a process in the terminal device of the present invention.

By loading the foregoing program recorded in the storage medium to a computer system, it is possible to realize the foregoing terminal device.

The embodiments and concrete examples of implementation discussed in the foregoing detailed explanation serve solely to illustrate the technical details of the present invention, which should not be narrowly interpreted within the limits of such embodiments and concrete examples, but rather may be applied in many variations within the spirit of the present invention, provided such variations do not exceed the scope of the patent claims set forth below.

INDUSTRIAL APPLICABILITY

In a service providing system of the present invention, a service provider can charge a user for modifying various parameters determining an operation of a control device. Thus, the present invention is applicable to services in general using the control device being kept under supervision of the user. The present invention is particularly suitable for a home-security service and/or an automobile-security service.

What is claimed is:

1. A control device, connected via a communication network to a server device that offers a service, detecting a state of an object to be monitored, wherein
the control device performs an operation according to a detected state of the object in accordance with a parameter determining an operation of the control device which operation corresponds to the detected state, and
the control device modifies the parameter in accordance with a parameter modification command which is received from the server device via the communication network, wherein the parameter modification command is a command, from a user of a communication terminal device connected to the server device via the communication network, for modifying the parameter.

2. The control device as set forth in claim 1, wherein
the control device stores plural kinds of operations to be performed according to a result of detection of the state of the object to be monitored, so that the operations are associated with detected states, and
when detecting the state of the object to be monitored, the control device determines an operation to be performed from among the plural kinds of operations corresponding to the detected state of the object, in accordance with the parameter.

3. The control device as set forth in claim 1, wherein
when detecting the state of the object to be monitored, the control device controls one or more devices to be controlled in accordance with the parameter according to the detected state, the devices to be controlled being installed in the object to be monitored.

4. The control device as set forth in claim 1, wherein
the control device downloads a program which is offered by the server device to obtain an additional operation that can be performed in accordance with a parameter, and changes a parameter related to the additional operation.

5. A communication terminal device communicating via a communication network with a server device that offers a service,
the communication terminal device comprising:
a display section that displays a plurality of choices of operations to be performed by a control device thereon in a user-selectable manner, according to a state of an object to be monitored which state has been detected by the control device, which is connected to the server device via a communication network, the plurality of choices displayed based on data received via the communication network from the server device; and
a control section that transmits, to the server device, a modification request for requesting to transmit, to the control device, a parameter modification command that is a command for modification to a parameter determining the operation of the control device which parameter is selected by the user, the parameter determining the operation of the control device which operation corresponds to the state detected by the control device, the control device modifying the parameter in accordance with the parameter modification command which is received from the server device via the communication network, wherein the parameter modification command is a command, from the user, for modifying the parameter.

6. A server device offering a service via a communication network to a control device that detects a state of an object to be monitored, wherein the server device is intercommunicatively connected via the communication network to a communication terminal device which is operated by a user, the server device receives, from the communication terminal device, a modification request for requesting to transmit, to the control device, a parameter modification command that is a command, from a user of the communication terminal device, for modification to a parameter determining an operation of the control device which parameter is selected by a user and which operation corresponds to the state detected by the control device, and the server device transmits, to the control device, the parameter modification command according to the received modification request so as to cause the control device to modify the parameter in accordance with the parameter modification command.

7. The server device as set forth in claim 6, wherein the server device stores therein a history of transmission of the parameter modification command or a history of the control device modifying a parameter, and the server device transmits the stored history to the communication terminal device.

8. The server device as set forth in claim 6, wherein the server device stores therein a user information database in which (i) identification information for identifying the communication terminal device is associated with (ii) identification information of the control device that is a destination for transmission of the parameter modification command, and the server device determines the control device that is a destination for transmission of the parameter modification command, in accordance with the identification information of the communication terminal device which has transmitted the modification request to the server device.

9. The server device as set forth in claim 6, wherein the control device is capable of modifying a plurality of parameters for each of a plurality of points to be monitored for detection of the state of the object to be monitored, and the server device stores therein a product information database which includes combination information specifying whether a combination of settings of the parameters concerning the control device is valid or not.

10. The server device as set forth in claim 9, comprising:

a validity judging section that judges whether a combination of parameter settings requested is valid or not in accordance with the combination information, upon receipt of the modification request.

11. A service providing system comprising:

a control device that detects a state of an object to be monitored; and a server device that offers a service to the control device via a communication network, wherein the control device performs an operation according to a detected state of the object in accordance with a parameter determining an operation of the control device which operation corresponds to the detected state, and the control device modifies the parameter in accordance with a parameter modification command which is received from the server device via the communication network, wherein the parameter modification command is a command, from a user of a communication terminal device connected to the server device via the communication network, for modifying the parameter.

12. A service providing system comprising:

a control device that detects a state of an object to be monitored;

a server device that offers a service to the control device via a communication network;

and a communication terminal device being connected to the server device via the communication network, wherein the control device performs an operation according to a detected state of the object in accordance with a parameter determining an operation of the control device which operation corresponds to the detected state, the control device modifies the parameter in accordance with a parameter modification command which is received from the server device via the communication network, wherein the parameter modification command is a command, from a user of the communication terminal device, for modifying the parameter, the communication terminal device includes:

a display section that displays a plurality of choices of operations to be performed by a control device thereon in a user-selectable manner, according to a state of an object to be monitored which state has been detected by the control device, which is connected to the server device via a communication network, the plurality of choices displayed based on data received via the communication network from the server device; and the control section that transmits, to the server device, a modification request for requesting to transmit, to the control device, a parameter modification command that is a command for modification to a parameter determining the operation of the control device which parameter is selected by the user, and the server device transmits the parameter modification command to the control device in accordance with the modification request which has been received from the communication terminal device.

13. A parameter modification method of modifying a parameter of a control device, the control device, connected via a communication network to a server device that offers a service, detecting a state of an object to be monitored, the method comprising:

a step of detecting the state of the object to be monitored; and a step of performing an operation according to a detected state of the object in accordance with a parameter determining an operation of the control device which operation corresponds to the detected state, and modifying the parameter in accordance with a parameter modification command which is received from the server device via the communication network, wherein the parameter modification command is a command, from a user of a communication terminal device connected to the server device via the communication network, for modifying the parameter.

14. A parameter modification method of a communication terminal device communicating via a communication network with a server device that offers a service to request for modification of a parameter of a control device that detects a state of an object to be monitored, the method comprising:
displaying a plurality of choices of operations to be performed by the control device in a user-selectable manner, according to the state of the object to be monitored which state has been detected by the control device, which is connected to the server device via a communication network, the plurality of choices displayed based on data received via the communication network from the server device; and
transmitting, to the server device, a modification request for requesting to transmit, to the control device, a parameter modification command that is a command, from a user of a communication terminal device connected to the server device via the communication network, for modification to a parameter determining the operation of the control device which parameter is selected by the user and which operation corresponds to the state detected by the control device,
the modification request transmitted in the transmitting step causing the server device to transmit the parameter modification command to the control device, the parameter modification command causing the control device to modify the parameter in accordance with the parameter modification command.

15. A parameter modification method of instructing a control device to modify a parameter of the control device via a communication network, the control device detecting a state of an object to be monitored, which parameter determines an operation of the control device which operation corresponds to a state detected by the control device, the method comprising:
a step of receiving, from a communication terminal device, a modification request for requesting to transmit, to the control device, a parameter modification command, from a user of the communication terminal device, that is a command for modification to a parameter is selected by a user; and
a step of transmitting, from a server device of the communication network to the control device, the parameter modification command according to the received modification request,
the parameter modification command transmitted in the transmitting step causing the control device to modify the parameter in accordance with the parameter modification command.

16. A service providing method in a service providing system that comprises: a control device that detects a state of an object to be monitored; and a server device that offers a service to the control device via a communication network; and a communication terminal device that is connected to the server device via the communication network, the method comprising:
(I) a step of the control device detecting the state of an object to be monitored;
(II) a step of the communication terminal device displaying a plurality of choices of operations to be performed by the control device in a user-selectable manner, according to the state of the object to be monitored which state has been detected by the control device, the plurality of choices displayed based on data received via the communication network from the server device;
(III) a step of the communication terminal device transmitting, to the server device, a modification request for requesting to transmit, to the control device, a parameter modification command, from a user of the communication terminal device, that is a command for modification to a parameter determining the operation of the control device which parameter is selected by the user;
(IV) a step of the server device transmitting the parameter modification command to the control device in accordance with the modification request which has been received from the communication terminal device;
(V) a step of the control device modifying the parameter in accordance with the parameter modification command which has been received from the server device; and
(VI) a step of performing an operation according to a detected state of the object in accordance with the parameter.

17. A service providing method in a service providing system that comprises: a control device; and a server device, connected to the control device via a communication network, offering an information providing service to the control device, the method comprising:
(I) a step of the server device transmitting, to the control device, a modification command, from a user of a communication terminal device connected to the server device via the communication network, for modifying a predetermined parameter determining an operation of the control device;
(II) a step of the control device modifying the parameter in accordance with the modification command for modifying the predetermined parameter which command has been received from the server device; and
(III) a step of the control device detecting a change in state of an object to be monitored, and operating according to an detected state of the object, wherein the modified parameter determines an operation that is performed by the control device according to the state detected by the control device.

18. The method as set forth in claim 17, wherein
upon receipt of a request for modifying the predetermined parameter from a user, the server device transmits, to the control device, the modification command for modifying the predetermined parameter in accordance with a content of the received request.

19. The method as set forth in claim 18, wherein
the request for modifying the predetermined parameter is transmitted from a communication terminal device operated by the user to the server device.

20. A control method of a server device being connected to a control device detecting a state of an object to be monitored and a communication terminal device via a communication network, the server device offering an information providing service with respect to the control device, the method comprising:
(I) a modification request accepting step of receiving a modification request from the communication terminal device, the modification request requesting to transmit, to the control device, a parameter modification command, from a user of the communication terminal device, for modifying a predetermined parameter determining an operation of the control device;

(II) a modification command transmitting step of generating the parameter modification command in accordance with the modification request, and then transmitting, from the server device, the parameter modification command to the control device so as to cause the control device to modify the parameter in accordance with the parameter modification command;

(III) a step of the control device detecting a change in state of an object to be monitored, and operating according to a detected state of the object in accordance with the modified parameter, wherein the modified parameter determines an operation that is performed by the control device according to the state detected by the control device; and (IV) a step of the server device requesting from one of the control device and the communication terminal device a fee for the transmission of the parameter modification command for modifying the predetermined parameter, in a case where the server device transmits, to the control device, the parameter modification command for modifying the predetermined parameter.

21. The method as set forth in claim 20, further comprising:

(V) a history recording step of storing, in a history information database, a content of a parameter setting when transmitting the parameter modification command to the control device.

* * * * *